(12) United States Patent
Ramanathan et al.

(10) Patent No.: US 11,770,298 B2
(45) Date of Patent: Sep. 26, 2023

(54) SYSTEM AND METHOD FOR ESTABLISHING NETWORK ELEMENT PERSONALITY PROFILES USING AI/ML

(71) Applicant: Verizon Patent and Licensing Inc., Basking Ridge, NJ (US)

(72) Inventors: Sankaran Ramanathan, Bridgewater, NJ (US); Gaurav B. Patel, Bridgewater, NJ (US); Brian A. Ward, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/680,382

(22) Filed: Feb. 25, 2022

(65) Prior Publication Data

US 2022/0191096 A1  Jun. 16, 2022

Related U.S. Application Data

(63) Continuation of application No. 17/122,099, filed on Dec. 15, 2020, now Pat. No. 11,290,327.

(51) Int. Cl.
*H04L 41/0816* (2022.01)
*H04L 43/0817* (2022.01)
*H04L 41/12* (2022.01)
*H04L 41/08* (2022.01)

(52) U.S. Cl.
CPC ...... *H04L 41/0816* (2013.01); *H04L 41/0886* (2013.01); *H04L 41/12* (2013.01); *H04L 43/0817* (2013.01)

(58) Field of Classification Search
CPC ............ H04L 41/0816; H04L 41/0886; H04L 41/0823; H04L 41/084; H04L 41/0846; H04L 41/085; H04L 41/0853; H04L 41/0856; H04L 41/12; H04L 43/0817
See application file for complete search history.

(56) References Cited

U.S. PATENT DOCUMENTS

| | | | |
|---|---|---|---|
| 10,511,491 B2 | 12/2019 | Kanojia et al. | |
| 10,678,457 B2 | 6/2020 | Jawahar et al. | |
| 10,771,345 B1* | 9/2020 | Louca | H04L 41/082 |
| 11,165,648 B1* | 11/2021 | Bollineni | H04L 41/16 |
| 2015/0229601 A1* | 8/2015 | Frey | H04L 41/0869 709/221 |
| 2016/0191325 A1* | 6/2016 | Pacella | H04L 45/20 370/254 |
| 2017/0093907 A1* | 3/2017 | Srivastava | H04L 41/12 |
| 2017/0212653 A1* | 7/2017 | Kanojia | H04L 43/0811 |
| 2017/0214577 A1* | 7/2017 | Kanojia | H04W 24/08 |
| 2017/0364702 A1* | 12/2017 | Goldfarb | H04L 63/10 |
| 2019/0342187 A1* | 11/2019 | Zavesky | H04L 41/5009 |
| 2020/0026446 A1* | 1/2020 | Jawahar | G06F 3/065 |
| 2020/0195673 A1* | 6/2020 | Lee | H04L 45/70 |

* cited by examiner

*Primary Examiner* — Jonathan A Bui

(57) ABSTRACT

A device obtains configuration parameters for multiple network elements of a network and receives first scores that assess a level of efficiency and a level of isolation for each of the multiple network elements. The device identifies a network element of the multiple network elements for modifying the identified network element's configuration based on the obtained configuration parameters and the received first scores.

22 Claims, 19 Drawing Sheets

SYSTEM AND METHOD FOR ESTABLISHING NETWORK ELEMENT PERSONALITY PROFILES USING AI/ML

CROSS-REFERENCE TO RELATED APPLICATION

The present application is a continuation of, and claims priority to, U.S. application Ser. No. 17/122,099 entitled "System and Method for Establishing Network Element Personality Profiles Using AI/ML," filed Dec. 15, 2020, the content of which is incorporated by reference herein in its entirety.

BACKGROUND

Networks typically include multiple elements (e.g., routers, gateways, switches, network functions, network control units, etc.) that are involved in carrying and/or switching network traffic from a source to a destination or involved in performing particular network functions with respect to the network traffic. As these networks have become increasingly complex, systems and software have been implemented to monitor and manage the configuration and operation of the network elements. These management systems acquire, organize, and maintain information about components of the networks. When the network needs repair, modification, expansion, or upgrading, a network administrator can refer to a network configuration management inventory in the system to determine an appropriate course of action. The network configuration management inventory may store location information and network addresses associated with the network elements, as well as information about the configuration and capabilities of hardware and software installed at the network elements.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Next Generation networks, such as Fifth Generation New Radio (5G NR) mobile networks, may include massive, dynamic, and expanding networks that are difficult to monitor and manage using existing configuration management inventory techniques. With Next Generation networks, inventory records can quickly become outdated and incorrect due to numerous inventory additions/removals that often cause errors. Embodiments described herein use network element personality profiles, broadcast from each network element in the network, to keep track of network element information that is relevant to maintaining network inventory records and updating stored network topology information. The network element information broadcast in the personality profiles may include key performance indicators, configuration parameters, and routing information associated with each network element. Embodiments described herein additionally use network element profile scores, calculated at each network element and published to a centralized network system, for evaluating the performance of network elements and regions of the network. A profile moderator implemented at the centralized network system may use the published network element profile scores for each network element to calculate an overall score for each network region within the network. The overall score for each network region may then be used for comparing the network regions with one another and for determining whether to modify the configuration of existing network elements within a given network region to improve network performance. A "network region" referred to herein may include a geographic region within which network components (e.g., network elements, network links, other network infrastructure) reside. A network may include multiple different network regions, where each network region has its own network topology associated with interconnecting numerous network elements to provide services to user equipment devices.

Figure 1:
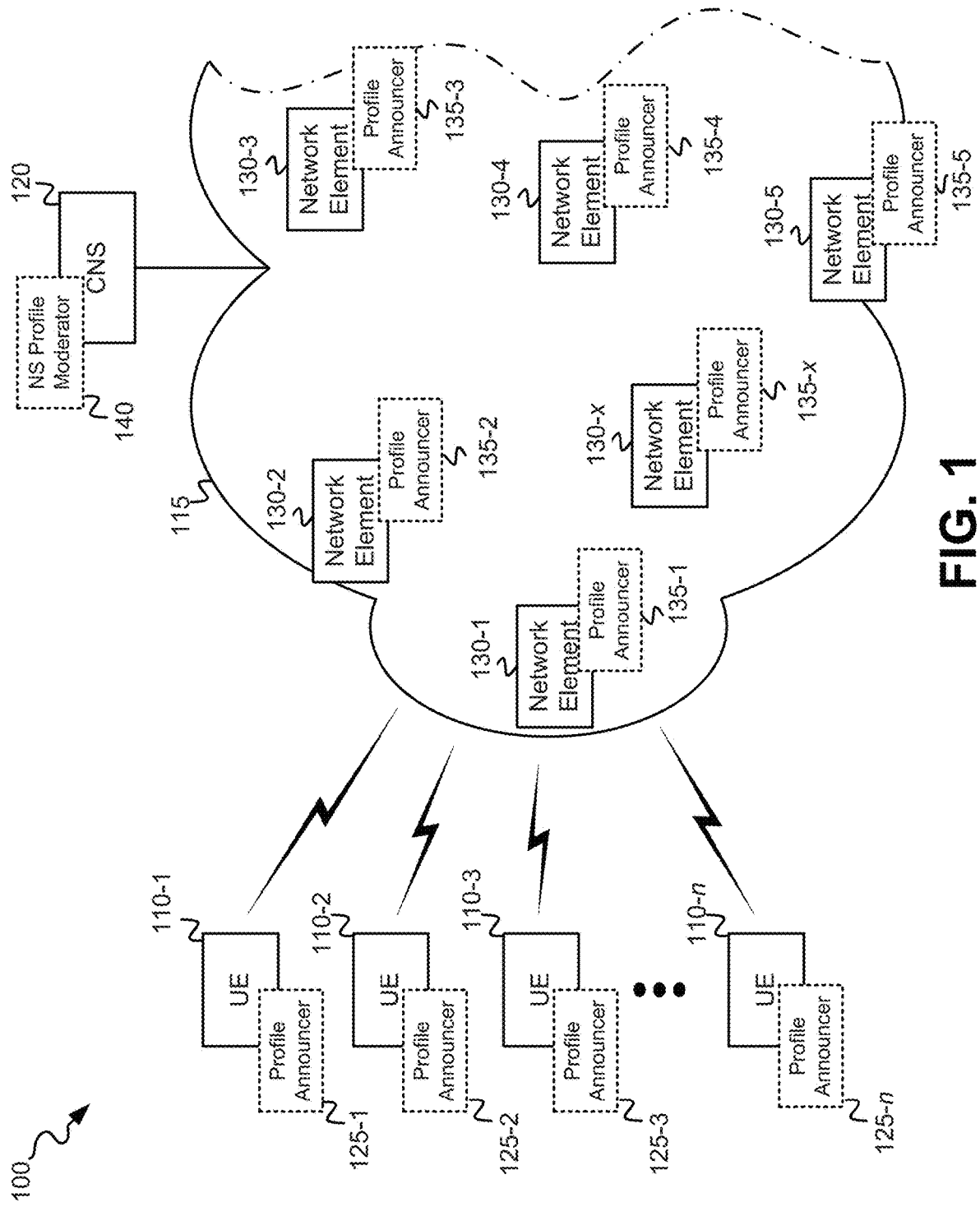
FIG. 1 depicts an exemplary network environment in which network element (NE) personality profiles are broadcast between NEs and to a Network System profile moderator.

FIG. 1 depicts an exemplary network environment 100 in which network element (NE) personality profiles are broadcast to a Network System profile moderator, and between NEs, to enable the assessment of NE population and density and the number of NEs in a network region surrounding each NE. As shown, network environment 100 may include multiple User Equipment devices (UEs) 110-1 through 110-n, a network 115, and a Centralized Network System (CNS) 120.

UEs 110-1 through 110-n (referred to herein as "UE 110" or "UEs 110") may each include any type of electronic device having a wired or wireless communication capability. UE 110 may include, for example, a laptop, palmtop, desktop, wearable, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 110. In some implementations, UEs 110 may each execute a respective Session Initiation Protocol (SIP) user agent (UA) (not shown) that may establish connections and sessions with other UEs 110 or with NEs. Protocols other than SIP may, however, be used. Each UE 110 may execute a respective Profile Announcer 125 that generates a UE personality profile and broadcasts the personality profile to a Network System (NS) profile moderator and to one or more NEs in network 115 to which the UE 110 is connected. The NS profile moderator and personality profiles are further described below.

Network 115 may include one or more interconnected networks of various types. Network 115 may include, for example, a Public Land Mobile Network(s) (PLMN), a local area network(s) (LAN), a wide area network(s) (WAN), a metropolitan area network (MAN), an Internet Protocol Multimedia Subsystem (IMS) network, and/or the Internet. Network 115 may, however, include other types of networks not specifically described herein. The PLMNs may include Fourth Generation (4G) or Next Generation mobile networks (e.g., Fifth Generation (5G) mobile networks).

Network 115, as shown, may include network elements 130-1 through 130-x located in one or more regions within network 110. Network elements 130-1 through 130-x may be variously interconnected (not shown) within network 115. Each of network elements 130-1 through 130-x (referred to herein individually and generically as "network element 130" or collectively as "network elements 130") may include any type of network device that is involved in carrying and/or switching network traffic from a source to a destination or is involved in performing particular network functions with respect to the network traffic. For example, each of network elements 130 may include a router, a gateway, a switch, a network control unit (NCU), or a device implementing one or more network functions (NFs). Each NF may include any type of physical or virtualized network function that performs a particular network function(s) (e.g., tunneling, switching, traffic analysis, signaling, security functions, etc.) within network 115. Each NE 130 may execute a respective Profile Announcer 135 that generates a NE personality profile and broadcasts the personality profile to one or more NEs in network 115, and to a NS profile moderator. Profile announcer 135 of each network element 130, and profile announcer 125 of each UE 110, may implement a same or similar functionality for generating a NE/UE personality profile and for broadcasting the personality profile, as described further below.

CNS 120 may include one or more network devices that perform network management functions, such as, for example, network monitoring, network analysis, and network management functions. CNS 120 additionally includes a NS profile moderator 140 that receives personality profiles and published network element profile (NEP) scores (described further herein) from NEs 130. NS Profile Moderator may also determine (NSPM) scores (also described further herein) based on the contents of the personality profiles and based on the NEP scores. NS profile moderator 140 uses the determined NSPM scores, and configuration parameters extracted from the personality profiles, to initiate a process for modifying configuration parameters of particular NEs in selected network regions to improve NE performance, as further described below.

The configuration of network components of network environment 100 shown in FIG. 1 is for illustrative purposes. Other configurations may be implemented. Therefore, network environment 100 may include additional, fewer, and/or different components that may be configured in a different arrangement than that depicted in FIG. 1. Though only a single network 115 is shown in FIG. 1, network environment 100 may include multiple (>1) networks with each having network elements 130 that generate and broadcast/publish personality profiles and NEP scores.

Figure 2:
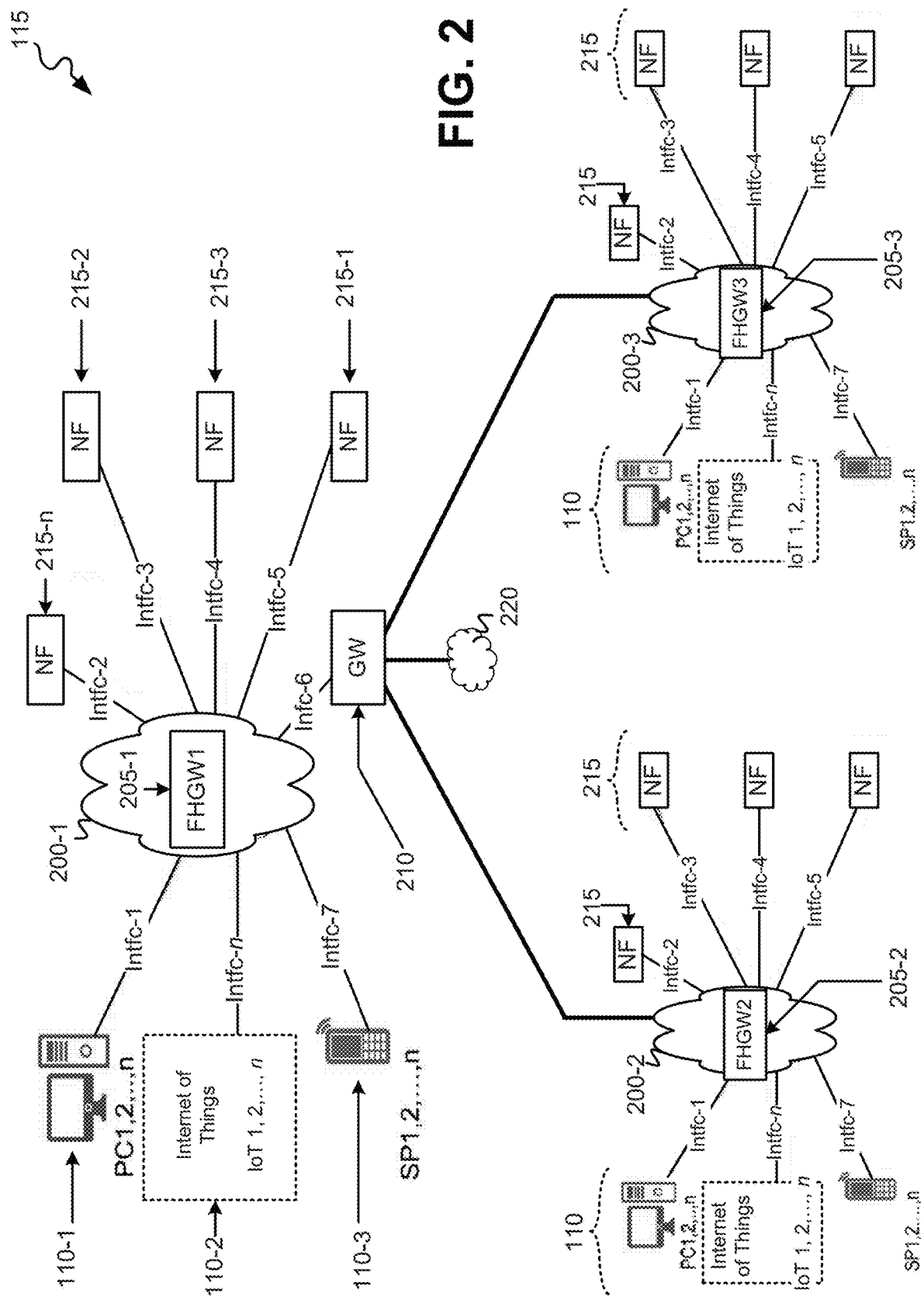
FIG. 2 depicts details of one example of the network of the network environment of FIG. 1.

FIG. 2 depicts details of one example of network 115 of FIG. 1. As shown, the example network 115 may include three network regions: network region 200-1, network region 200-2, and network region 200-3. Network region 200-1 may include a Front Haul Gateway (FHGW) 205-1, a gateway (GW) 210, network functions (NFs) 215-1 through 215-n, personal computer (PC) UEs 110-1, Internet of Things (IoT) UEs 110-2, and smart phone (SP) UEs 110-3.

FHGW 205-1 includes a network element that may operate as a gateway which supports edge and far-edge cloud deployment and which connects Common Public Radio Interface (CPRI) UEs to an "all-in-cloud" Base Transceiver Station (BTS) architecture. In some implementations, FHGW 205-1 may be co-located with a virtual Distributed Unit (vDU) in a Cloud Radio Access Network (C-RAN) data center, or co-located with a vDU at a distributed RAN (D-RAN) site. FHGW 205-1 may include multiple different wired and wireless interfaces that connect to UEs in network region 200-1. As shown, FHGW 205-1 may connect to PCs 110-1 via interface intfc-1, to NF 215-1 via interface intfc-5, to NF 215-3 via interface intfc-4, to NF 215-2 via interface intfc-3, to NF 215-n via interface intfc-2, to SPs 110-3 via interface intfc-7, and to IoT devices 110-2 via interface intfc-n.

GW 210 includes a network element that operates as a gateway between network regions 200-1, 200-2 and 200-3. NFs 215-1 through 215-n include various types of physical or virtual network functions. The physical network functions may be implemented within a stand-alone device(s), and the virtual network functions may be implemented as software components installed within computational network devices. Each network function may perform a specific function(s) and include defined external interfaces and defined functional behavior. PC UEs 110-1 include various types of personal computers (e.g., laptop, desktop, wearable, or tablet computers) that connect to FHGW 205-1 via wired or wireless interfaces. IoT UEs 110-2 include various types of IoT or Machine-to-Machine (M2M) devices that connect to FHGW 205-1 via wired or wireless interfaces. SP UEs 110-3 include cellular telephones with "smart phone" capability that include one or more wireless interfaces (e.g., a CPRI interface(s)) for connecting with FHGW 205-1.

In the example of network 115 shown in FIG. 2, network region 200-2 includes, similar to network region 200-1, a FHGW 205-2 that further includes different wired and wireless interfaces that connect to various network functions 215 and various UEs (e.g., PCs, IoT devices, SPs) of network region 200-2. Similarly, network region 200-3 includes a FHGW 205-3 that also includes multiple wired and wireless interfaces that connect to various network functions 215 and various UEs (e.g., PCs, IoT devices, SPs) of network region 200-3.

GW 210 may further connect to one or more other network region(s) of network 115 (not shown), or to an external network(s) 220. The external network(s) 220 may include, for example, a wired and/or wireless local area network (LAN), a wired and/or wireless wide area network (WAN), a metropolitan area network (MAN), an intranet, and/or the Internet.

Figure 3:
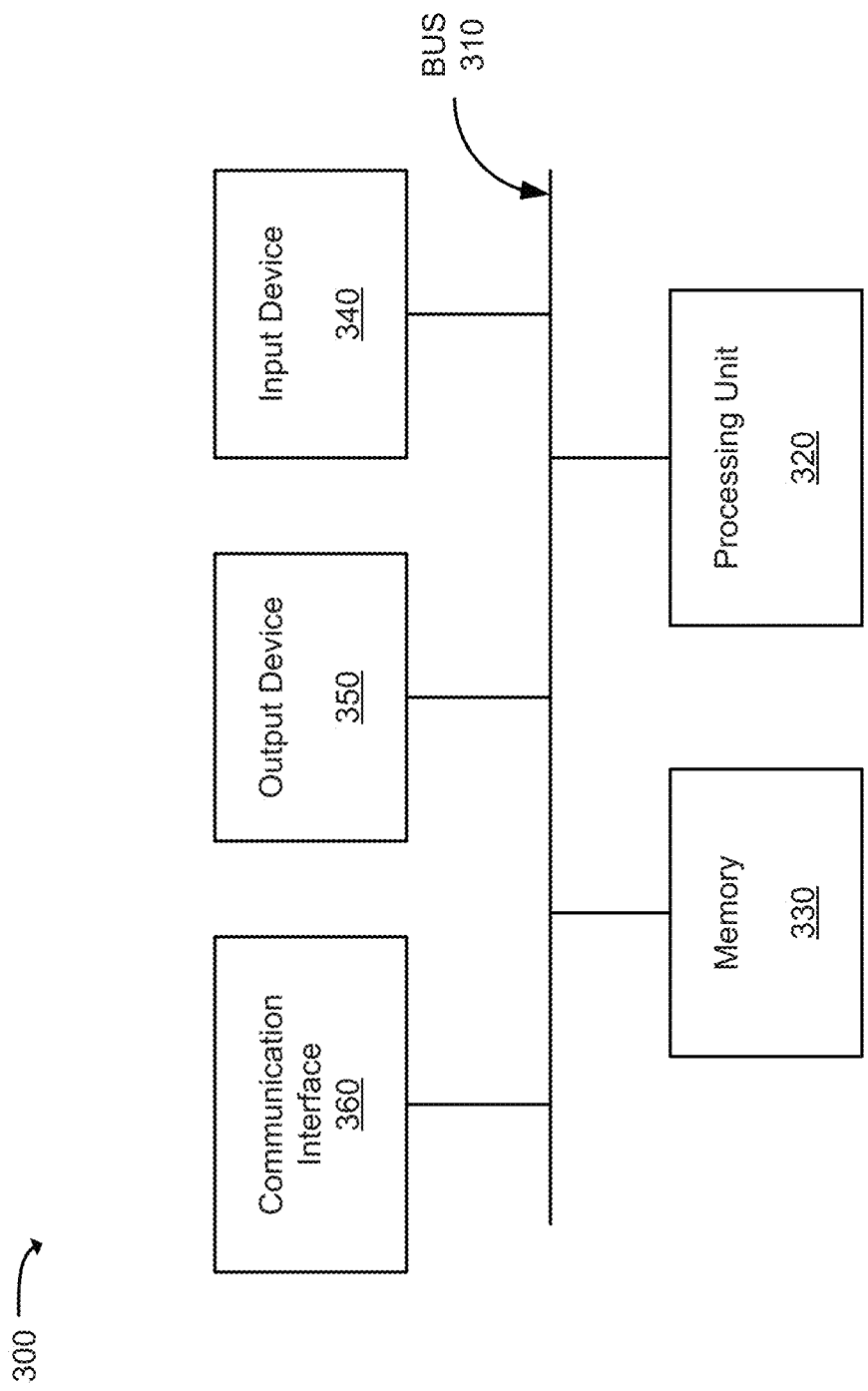
FIG. 3 is a diagram that depicts exemplary components of a device that may correspond to the User Equipment devices, one or more devices of the Centralized Network System, and/or the NEs of FIG. 1.

FIG. 3 is a diagram that depicts exemplary components of a device 300. UEs 110, CNS 120, and network elements 130 may be similarly configured. In the case of devices executing virtualized network functions, the devices may be also be similarly configured. Device 300 may include a bus 310, a processing unit 320, a memory 330, an input device 340, an output device 350, and a communication interface 360. Bus 310 may include a path that permits communication among the components of device 300.

Processing unit 320 may include one or more processors or microprocessors, or processing logic, which may interpret and execute instructions. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via network 115 and/or other networks not shown in FIGS. 1 and 2.

The configuration of components of device 300 illustrated in FIG. 3 is for illustrative purposes. Other configurations may be implemented. Therefore, device 300 may include additional, fewer and/or different components than those depicted in FIG. 3.

Figure 4:
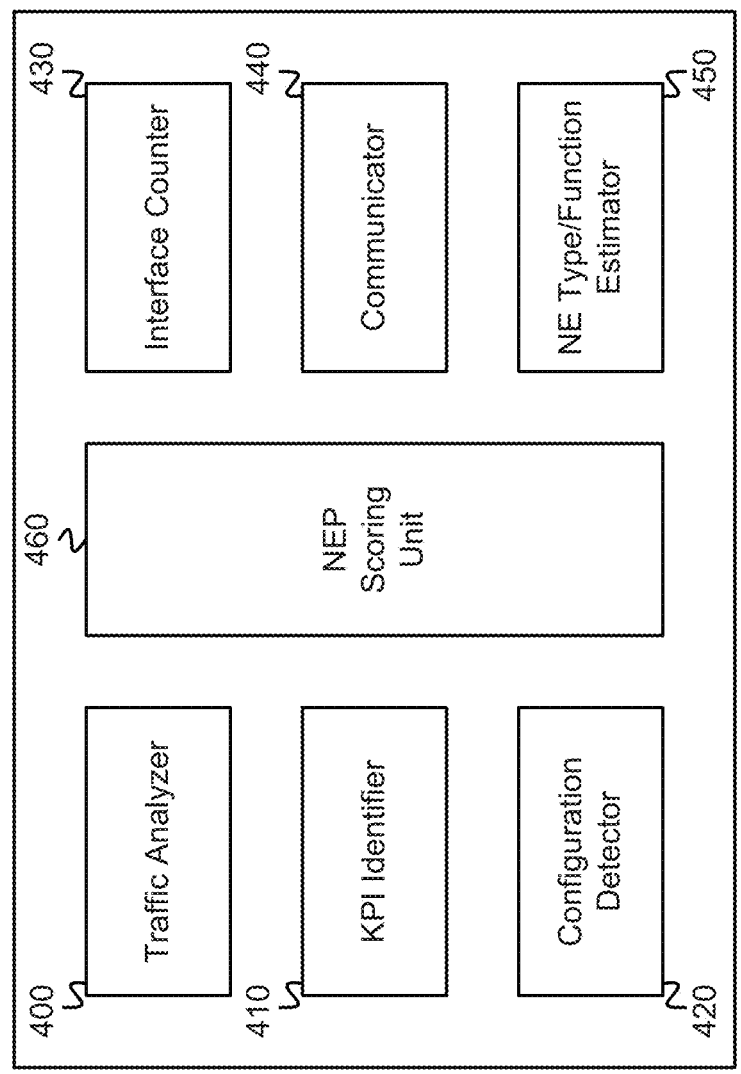
FIG. 4 is a diagram that illustrates components of a profile announcer of FIG. 1.

FIG. 4 is a diagram that illustrates components of a profile announcer 125/135. In some implementations, the components shown in FIG. 4 may represent functional components that may, for example, be implemented as instructions stored in memory 330 and executed by processing unit 320 of a device 300. In other implementations, one or more of the functional components shown in FIG. 4 may be implemented in hardware. Profile announcer 125/135 may include a traffic analyzer 400, a KPI identifier 410, a configuration detector 420, an interface counter 430, a communicator 440, a NE type/function estimator 450 and a NEP scoring unit 460.

Traffic analyzer 400 may analyze incoming and/or outgoing traffic at an NE 130 or UE 110 to determine various different performance indicators including, for example, usage frequency, failure rate, bandwidth, throughput, latency, jitter, packet loss, etc.

KPI identifier 410 may, based on the results of the analysis by traffic analyzer 400, identify specific measured performance indicators as KPIs. For example, the identified KPIs may include usage metrics, such as usage frequency and/or failure rate, that may be associated with each interface of the NE 130 or UE 110.

Configuration detector 420 determines the configuration parameters of the NE 130 or UE 110 associated with profile announcer 125/135 and the configuration parameters of other UEs 110 and other NEs 130. Configuration detector 420 may retrieve the configuration parameters of the NE 130 or UE 110 from local memory. In the case of other UEs 110 or other NEs 130, configuration detector 420 may extract the UEs' 110 or NEs' 130 configuration parameters from broadcast personality profiles. The configuration parameters may include, for example, a device type for the NE 130 or UE 110 (e.g., smartphone, fixed device), a technology identifier (e.g., 4G, 5G) for the NE 130 or UE 110, an indicator of whether Dynamic Spectrum Sharing (DSS) is supported by the device, etc.

Interface counter 430 obtains the configuration parameters from configuration detector 420 and identifies and counts the number of interfaces that are currently available for communication at the NE 130 or UE 110. Communicator 440 receives broadcast personality profiles from UEs 110 and other NEs 130 and extracts the contents of each personality profile. Communicator 440 additionally broadcasts the NE 130's own personality profile, publishes the NE 130's NEP score to the NS profile moderator 140, and sends and receives other messages to/from NS profile moderator 140.

NE type/function estimator 450 estimates the other NEs' 130 and UEs' 110 types and/or functions by comparing each NE 130's and UE 110's configuration parameters against pre-defined or previously known NE and UE templates, as described further herein. The known NE types and/or functions may, for example, include mobile user equipment, RAN connectivity equipment, network function (NF) equipment, and central compute unit equipment, multi-access edge compute (MEC) equipment, unique network functions (UNF) and/or user applications integrated or connected with MEC equipment, virtualized network functions (VNFs) (e.g., 5G NR Option 3x 4G Core VNFs, and containerized network functions (CNFs) (e.g., stand-alone option 2 5G Core CNFs). UNFs may include, for example, Access and Mobility Management Functions (AMFs), User Plane Functions (UPFs), and Session Management Functions (SMFs).

NEP scoring unit 460 generates a NEP score for the associated NE 130, the value of which enables an assessment of the NE 130's level of isolation, necessity, and efficiency within a particular region of network 115. The NEP scoring function produces a higher score for the NE 130 if the NE 130 is more densely surrounded by other NEs 130, is well-connected to other NEs 130/UEs 110, and/or is located in a more populated network region. Details of an implementation of NEP score determination is described below.

The configuration of components of profile announcer 125/135 illustrated in FIG. 4 is for illustrative purposes. Other configurations may be implemented. Therefore, profile announcer 125/135 may include additional, fewer and/or different components than those depicted in FIG. 4.

Figure 5:
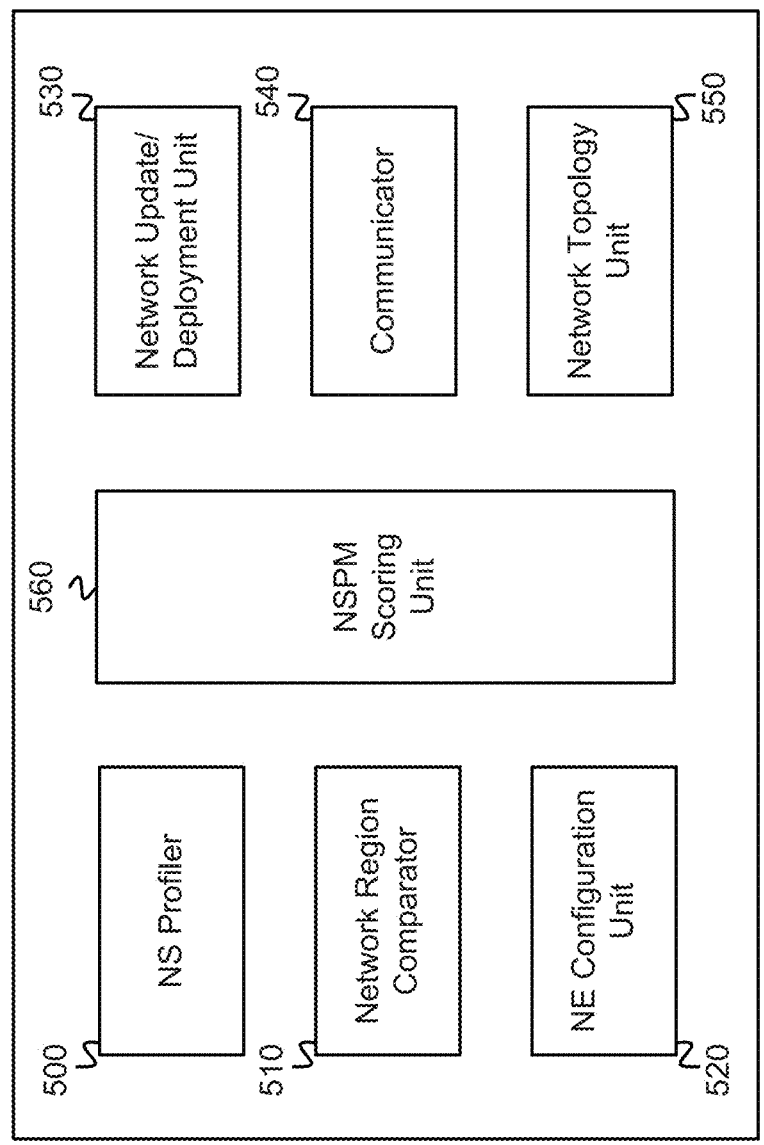
FIG. 5 is a diagram that illustrates components of the Network System profile moderator of FIG. 1.

FIG. 5 is a diagram that illustrates components of a NS profile moderator 140. In some implementations, the components shown in FIG. 5 may represent functional components that may, for example, be implemented as instructions stored in memory 330 and executed by processing unit 320 of a device 300. In other implementations, one or more of the functional components shown in FIG. 5 may be implemented in hardware. NS profile moderator 140 may include a NS profiler 500, a network region comparator 510, a NE configuration unit 520, a network update/deployment unit 530, a communicator 540, a network topology unit 550, and a Network System Profile Moderator (NSPM) scoring unit 560.

NS profiler 500 obtains each published NEP score received by communicator 540 from a NE 130, stores it locally in association with the ID of the NE 130 that published the NEP score, and provides the NEP score to NSPM scoring unit 560 for calculation of an updated NSPM score for the network region that includes the NE 130. Network region comparator 510 compares the NSPM scores for each network region that have been calculated by NSPM scoring unit 560. Based on the NSPM score comparison, network region comparator 510 identifies a highest scoring network region, and identifies the NEP score(s) whose contribution made the identified network region the highest scoring network region. Network region comparator 510 further identifies NEs 130 from which each of the identified NEP scores was published. NE configuration unit 520 further obtains configuration parameters for the NE 130 identified by network region comparator 510 and classifies the obtained configuration parameters as "best configuration parameters" for the NE 130s. NE configuration unit 520 then identifies a same or similar NE(s) in a lower scoring network region(s) of network 115 and forwards the "best configuration parameters" to communicator 540 for sending to the identified same/similar NEs in the lower scoring network regions.

Network update/deployment unit 530 receives Configuration Modification Requests from profile announcers 135 that request the modification of configuration parameters at respective NEs 130 based on the received "best configuration parameters." Network update/deployment unit 530 initiates network update/deployment procedures with CNS 120 to modify the requested configuration parameters of the NEs 130. Communicator 540 receives published NEP scores from NEs 130, receives Configuration Modification Requests from profile announcers 135 associated with NEs 130, sends "best configuration parameters" to profile announcers 135, initiates network update/deployment procedures with CNS 120, and sends and receives other messages from CNS 120 and/or profile announcers 125/135.

Network topology unit 550 updates NE information in a data structure that stores network topology information for network 115 based on the completion of network update/deployment procedures by CNS 120. NSPM scoring unit 560 calculates NSPM scores for each network region in network 115 based on NEP scores of the NEs 130 in each network region.

The configuration of components of NS profile moderator 140 illustrated in FIG. 5 is for illustrative purposes. Other configurations may be implemented. Therefore, profile moderator 140 may include additional, fewer and/or different components than those depicted in FIG. 5.

Figure 6:
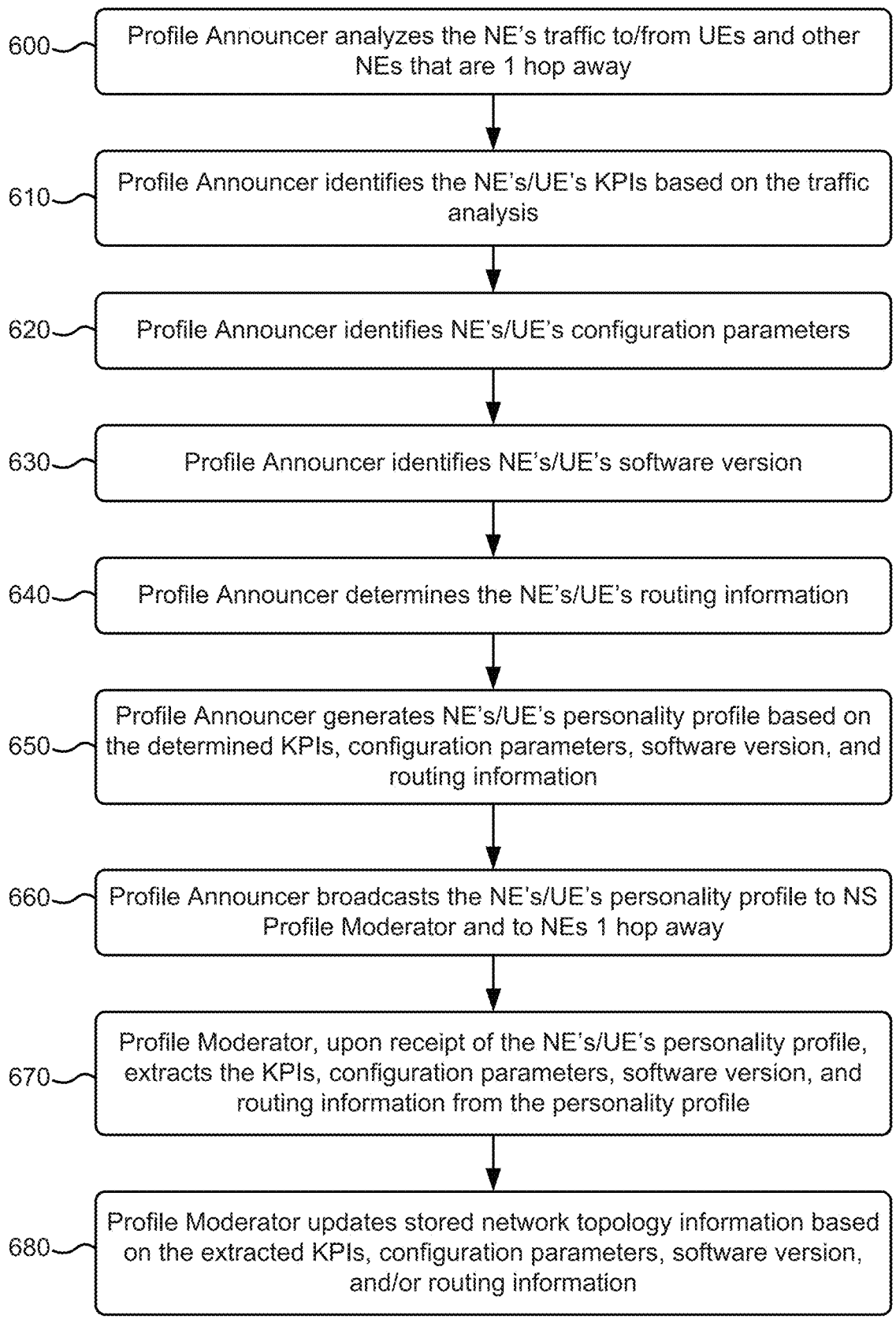
FIG. 6 is a flow diagram of an exemplary process for generating and broadcasting a personality profile from a NE to the Network System profile moderator and for updating network topology information based on information extracted from the personality profile.

FIG. 6 is a flow diagram of an exemplary process for generating and broadcasting a personality profile to NS profile moderator 140 and other NEs 130 and for updating network topology information based on information extracted from the personality profile. The exemplary process of FIG. 6 may be implemented by a profile announcer 125 of a UE 110 or a profile announcer 135 of a NE 130, in conjunction with NS profile moderator 140. The process of FIG. 6 may be repeated periodically, or based on the occurrence of a particular event at a NE 130 or UE 110 (e.g., a change in configuration parameters, a change in usage metrics, etc.). The exemplary process of FIG. 6 is described below with reference to the exemplary messaging/operations/data flow diagram of FIG. 7.

The exemplary process may include profile announcer 125 or 135 analyzing the NE 130's traffic to/from UEs 110, and other NEs 130, that are one hop away (block 600), and identifying the NE 130's or the UE 110's KPIs based on the traffic analysis (block 610). Traffic analyzer 400 of profile announcer 125 or 135 may analyze incoming and/or outgoing traffic at the NE 130 or UE 110 to determine various different performance indicators including, for example, usage frequency, failure rate, bandwidth, throughput, latency, jitter, packet loss, etc. KPI identifier 410 may, based on the results of the analysis by traffic analyzer 400, identify specific measured performance indicators as KPIs. For example, the identified KPIs may include usage metrics, such as usage frequency and failure rate, that may be associated with each interface of the NE 130 or UE 110. In some implementations, the usage frequency for each interface may be classified as "extremely high," "high," "low," or "very low." The failure rate may include a rate of failure (e.g., in percentage of packets transmitted) for each interface of the NE 130 or UE 110. For example, a gateway NE 130 may have interfaces $intfc_1$ through $intfc_n$, and $intfc_6$ may have a 0.5% failure rate and $intfc_n$, may have a 0.1% failure rate.

The profile announcer 125 or 135 identifies the NE 130's or UE 110's configuration parameters (block 620). Configuration detector 420 of profile announcer 125 or 135 determines the configuration parameters of the NE 130 or UE 110 associated with profile announcer 125 or 135. The NE 130's or UE's 110 own configuration parameters may be stored locally for retrieval by configuration detector 420. The configuration parameters may include, for example, a device type for the NE 130 or UE 110 (e.g., smartphone, fixed device), a technology identifier (e.g., 4G, 5G) for the NE 130 or UE 110, an indicator of whether Dynamic Spectrum Sharing (DSS) is supported by the device, a Maximum Transmission Unit (MTU) size allowed for the NE 130 or UE 110, an Internet Protocol (IP) prefix length associated with the NE 130 or UE 110, maximum number of sectors allowed, etc. Though not specifically described herein, other types of configuration parameters for the NE 130 or UE 110 may be used.

The profile announcer 125 or 135 identifies the NE 130's or UE 110's software version (block 630). The version of software used at NE 130 or UE 110 may be stored in memory for retrieval by profile announcer 125/135. For example, in the case of a UE 110, the UE 110 may use version x of the Android operating system and data identifying Android version x can be stored in local memory.

The profile announcer 125 or 135 determines the NE 130's or UE 110's routing information (block 640). Communicator 440 of profile announcer 125/135 may previously have received a broadcast personality profile from each NE 130 and UE 110 that is a number n of hops (e.g., one hop) away from the NE 130 associated with the profile announcer 125 or 135. The number n of hops may be a configurable number, such as any number greater than or equal to one, or a number n of hops less than a specified threshold value (e.g., 2 hops or less). Profile announcer 125 or 135 may then extract routing-related information from each personality profile (e.g., interfaces, adjacent node IDs) and store the information in local memory. Profile announcer 125 or 135 may determine the routing information for the NE 130 itself based on the routing-related information received from NEs 130 and UEs 110 that are one hop away, and based on its own routing-related information (e.g., interfaces used for each NE 130 or UE 110 that is one hop away) known to the NE 130 itself.

Figure 7:
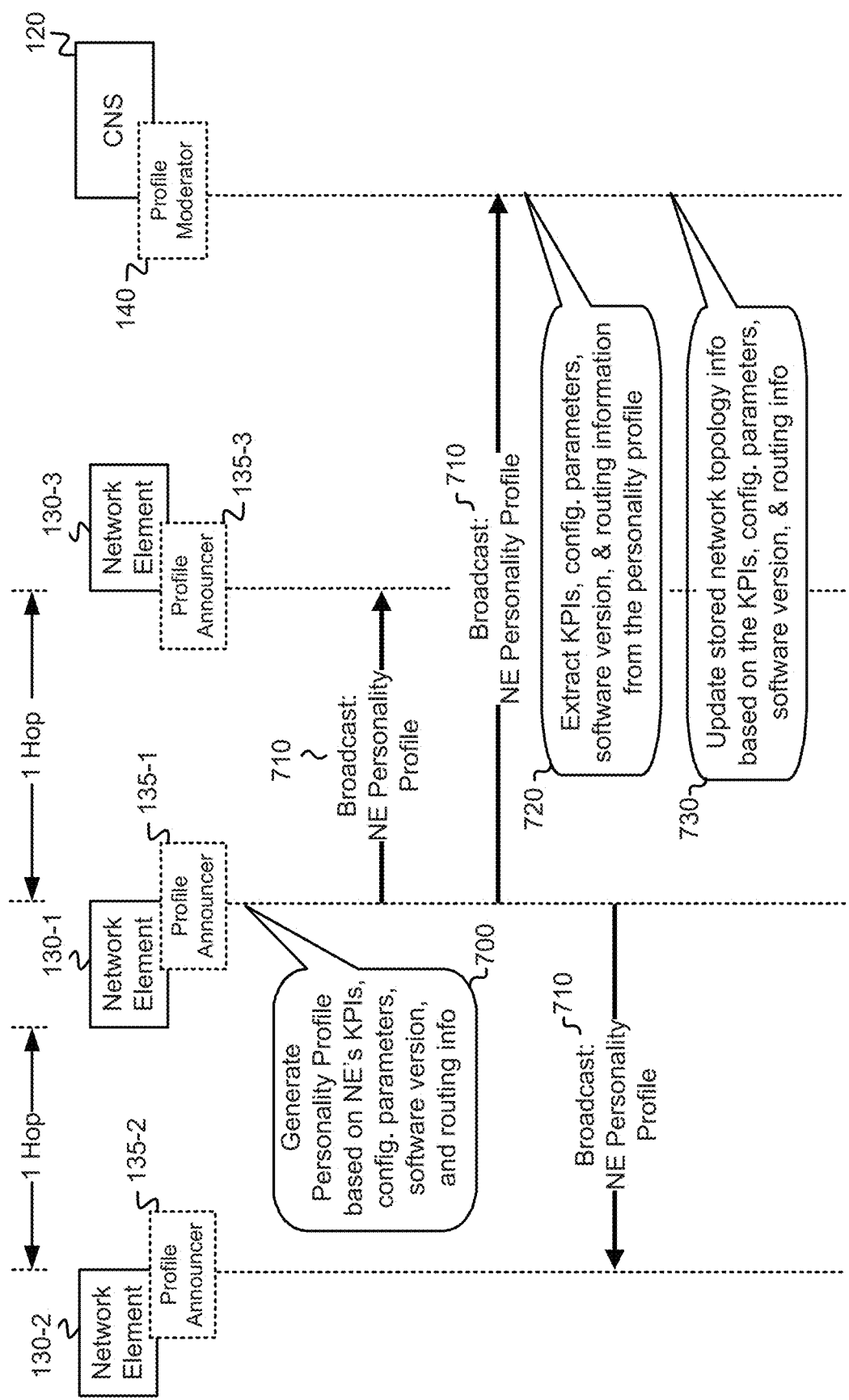
FIG. 7 depicts exemplary operations, messages, and data flows associated with the exemplary process of FIG. 6.

The profile announcer 125 or 135 generates the NE 130's or UE 110's personality profile based on the determined KPIs, configuration parameters, software version, and routing information (block 650) and broadcasts the NE 130's or UE 110's personality profile to NS profile moderator 140 and to NEs 130 that are one hop away (block 660). Profile announcer 125 or 135 stores the configuration parameters identified in block 620, the software version identified in block 630, and the routing information determined in block 640 in a particular format within an encapsulated message and then broadcasts the message to NEs 130 that are one hop away within network 115 and to CNS 120. FIG. 7 illustrates an example of a NE 130-1 generating 700 a personality profile based on the NE 130-1's KPIs, configuration parameters, software version, and routing information. NE 130-1 then broadcasts a message 710 including the personality profile to NEs 130-2 and 130-3 that are each one hop away, and to NS profile moderator 140 at CNS 120.

The NS Profile Moderator 140, upon receipt of the NE 130's or UE 110's broadcast personality profile, extracts the KPIs, configuration parameters, software version, and routing information from the personality profile (block 670), and updates stored network topology information for network 115 based on the extracted KPIs, configuration parameters, software version and/or routing information (block 680). CNS 120 may store network topology information for network 115 that includes network node IDs (e.g., UE 110 and NE 130 node IDs), link and interface information for interconnections between each network node, link and interface status information, link cost information, etc. The network topology information may include a global view of network 115 that enables a network model to simulate the network 115. FIG. 7 depicts NS profile moderator 140, upon receipt of the broadcast message 710 that includes NE 130-1's personality profile, extracting 720 the KPIs, configuration parameters, software version, and routing information from the personality profile. FIG. 7 further shows profile moderator 140 of CNS 120 updating 730 network topology information stored at CNS 120 based on the extracted KPIs, configuration parameters, software version, and routing information.

Figure 8:
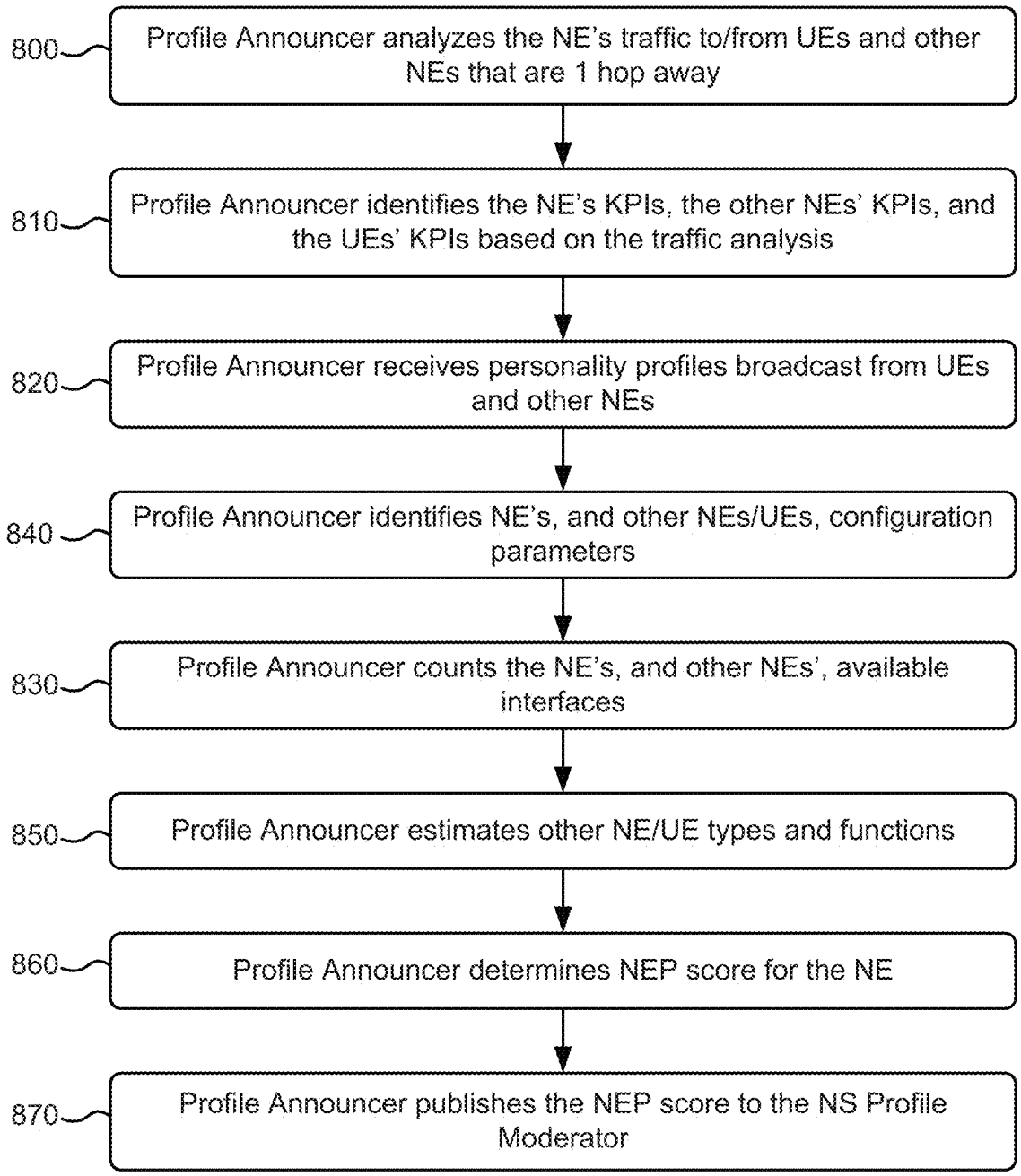
FIG. 8 is a flow diagram of an exemplary process for generating a NE Profile score for a network element based on various existing network conditions in the vicinity of the NE and based on configuration parameters of the NE itself and other NEs and/or User Equipment devices.

FIG. 8 is a flow diagram of an exemplary process for generating a NEP score for a NE 130 based on various network conditions in the vicinity of the NE 130 and based on the configuration parameters of the NE 130 itself and other NEs or UEs within one hop of the NE 130. The exemplary process of FIG. 8 may be implemented by a profile announcer 135 of a NE 130. The exemplary process of FIG. 8 is described below with reference to the exemplary messaging/operations/data flow diagram of FIG. 9. The exemplary process of FIG. 8 may be repeated periodically or upon an occurrence of a particular event (e.g., receipt of an updated personality profile from a NE 1 hop away, change in at least one KPI of the NE 130, etc.).

Figure 9:
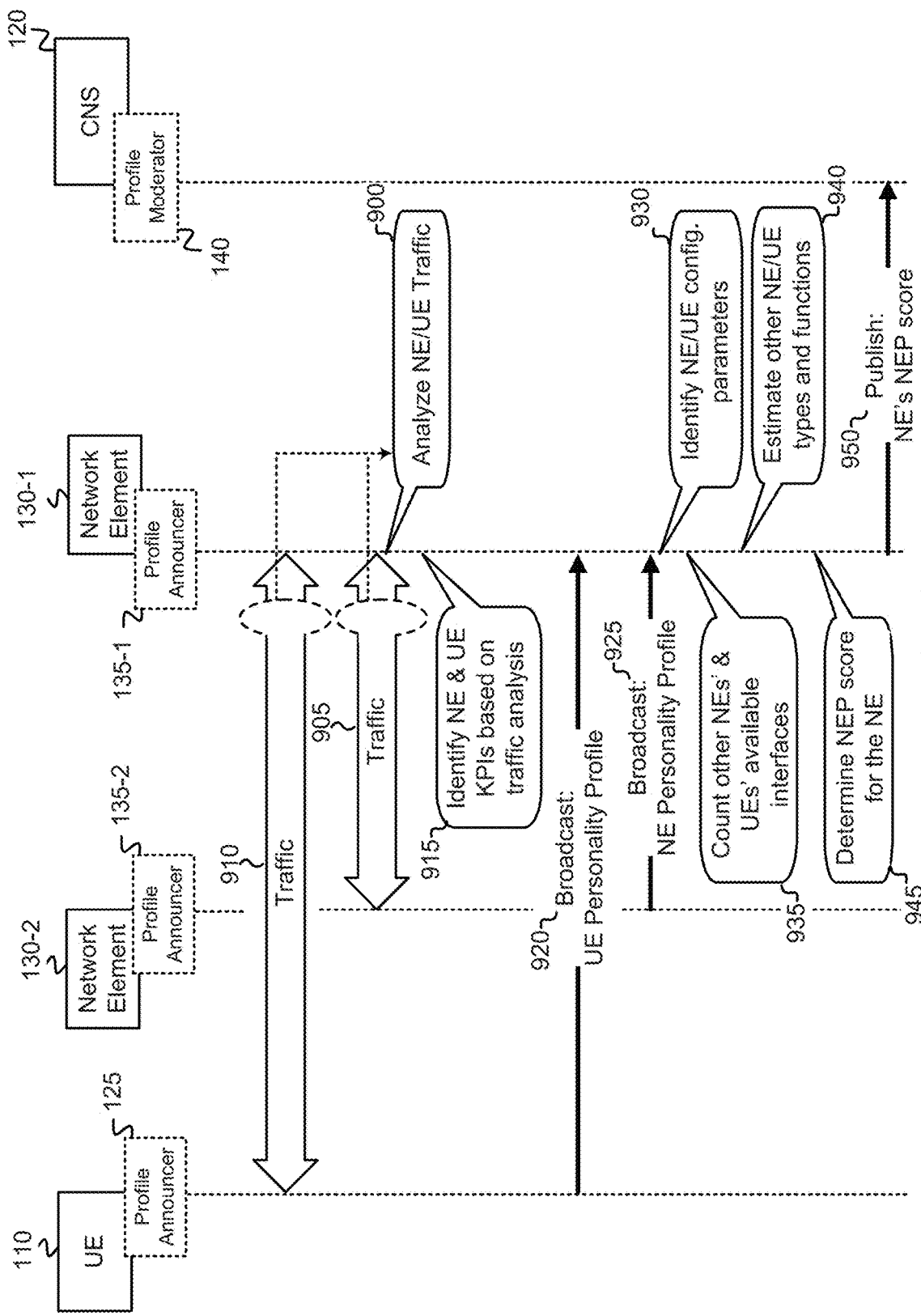
FIG. 9 depicts exemplary operations, messages, and data flows associated with the exemplary process of FIG. 8.

The exemplary process may include Profile Announcer 135 analyzing the NE 130's traffic to and/or from UEs 110 and other NEs 130 that are one hop away (block 800) and identifying the NE 130's KPIs, the other NE 130$s'$ KPIs, and the UE 110$s'$ KPIs based on the traffic analysis (block 810). Traffic analyzer 400 of profile announcer 135 may analyze incoming and/or outgoing traffic at the NE 130 to determine different performance indicators including, for example, usage frequency, failure rate, bandwidth, throughput, latency, jitter, packet loss, etc. KPI identifier 410 may, based on the results of the analysis by traffic analyzer 400, identify specific measured performance indicators as KPIs for the NE 130 itself, for other NEs 130 that are one hop away, and for UEs 110 that are one hop away. FIG. 9 illustrates a profile announcer 135-1 of a network element 130-1 analyzing 900 traffic 905 to/from another network element 130-2 and traffic 910 to/from a UE 110, and identifying 915 NE and UE KPIs based on the traffic analysis.

Profile announcer 135 receives personality profiles broadcast from UEs 110 and other NEs (block 820). Communicator 440 of profile announcer 135 receives broadcast personality profiles and forwards the personality profiles to, for example, configuration detector 420. FIG. 9 illustrates an example of a NE 130-1 receiving a message 920, which includes a personality profile for a UE 110, broadcast from a UE 110 that is one hop away from NE 130-1. FIG. 9 further shows an example of NE 130-1 receiving a message 925, that includes a personality profile for a NE 130-2, broadcast from the NE 130-2 that is one hop away from NE 130-1.

Profile announcer 135 identifies the NE 130's, and other NEs'/UEs', configuration parameters (block 830), and counts the NE 130's, and other NEs'/UEs', available interfaces (block 840). Configuration detector 420 of profile announcer 135 extracts the configuration parameters from each personality profile forwarded from communicator 440 and stores the configuration parameters in memory for each NE 130 and UE 110. Profile announcer 135 may subsequently perform a lookup into memory to identify the configuration parameters for each NE 130 and UE 110 that is one hop away in network 115. The configuration parameters may include those already described above with respect to block 620 of FIG. 6. Interface counter 430 obtains the retrieved configuration parameters from configuration detector 420 and, based on the configuration parameters for each NE 130 and UE 110, identifies and counts the number of interfaces that are currently available for communication for NE 130, for each other NE 130, and for the UEs 110. FIG. 9 depicts profile announcer 135-1 of NE 130-1 identifying 930 other NE and UE configuration parameters and counting 935 other NEs' and UEs' available interfaces.

Profile announcer 135 estimates the other NEs', and the UEs', types and functions (block 850). NE type/function estimator 450 of profile announcer 135 may estimate the other NEs' 130 and UEs' 110 types and/or functions by comparing each NE 130's and UE 110's configuration parameters against pre-defined or previously known NE and UE templates. For example, a NE 130 with configuration parameters that are identical to, or very similar to, the configuration parameters of a pre-defined NE template, can be determined to be a same type and/or function as specified in the pre-defined NE template. The known NE types and/or known functions may include mobile user equipment, RAN connectivity equipment, network function (NF) equipment, central compute unit equipment, MEC equipment, UNFs and/or user applications integrated or connected with MEC equipment, VNFs, and CNFs. The UNFs may include, for example, AMFs, UPFs, and SMFs. Details of one exemplary implementation of block 850 is described below with respect to FIG. 10. FIG. 9 depicts profile announcer 135-1 of NE 130-1 estimating 940 other NE and UE types and/or functions.

Profile Announcer 135 determines a Network Element Profile (NEP) score for the NE (block 860) and publishes the NEP score to the NS Profile Moderator 140 (block 870). NEP scoring unit 460 of profile announcer 135 generates a NEP score for the associated NE 130. The NEP score enables an assessment of the NE 130's level of isolation, necessity, and efficiency within a particular region of network 115. The NEP scoring function produces a higher score for the NE 130 if the NE 130 is more densely surrounded by other NEs 130, is well-connected to other NEs 130/UEs 110, and/or is located in a more populated network area. Details of one exemplary implementation of block 860 is described below with respect to FIG. 11. Upon generation of the NEP score for the NE 130, communicator 440 of profile announcer 135 encapsulates a message whose contents include the NEP score determined in block 860 and publishes the NEP score by sending the message to NS profile moderator 140. FIG. 9 shows profile announcer 135-1 of network element 130-1 determining 945 a NEP score for the NE 130, and publishing 950 the NE 130's NEP score to NS profile moderator 140 of CNS 120.

Figure 10:
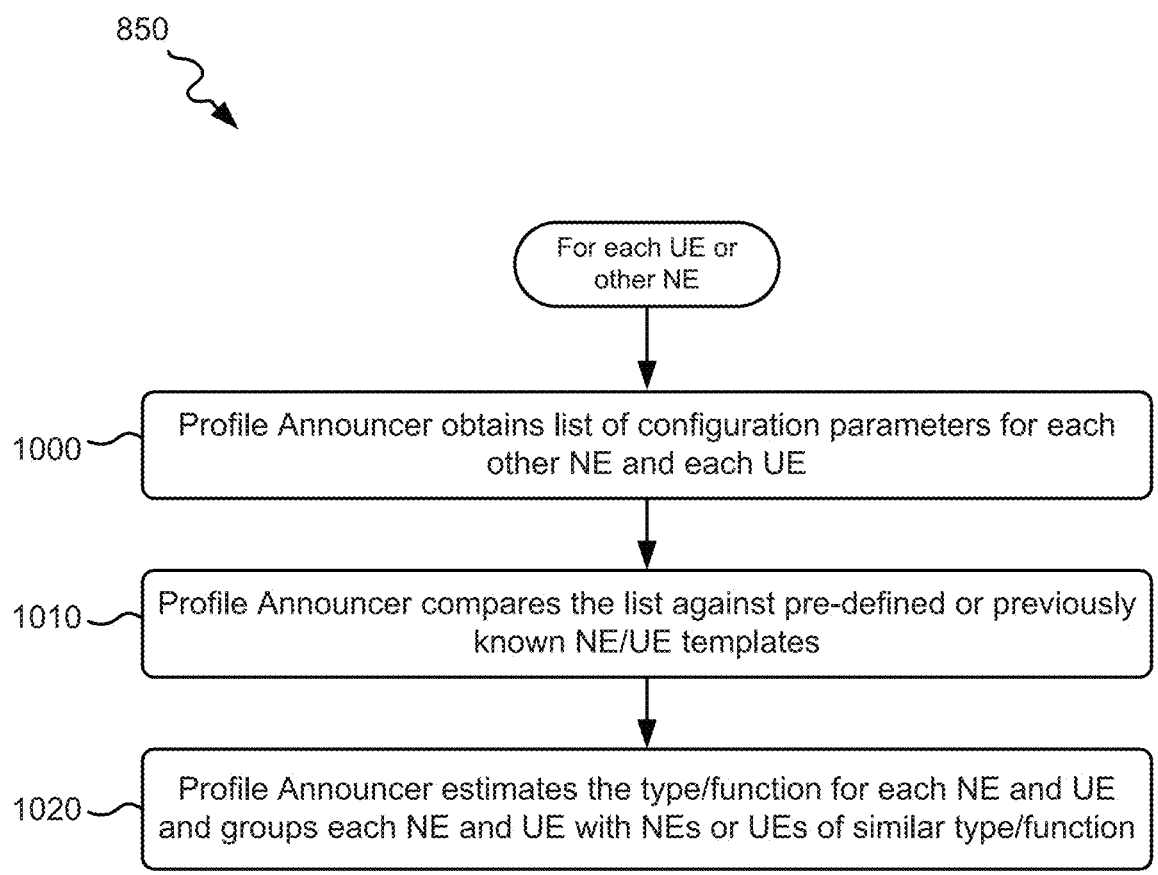
FIG. 10 is a flow diagram of one exemplary implementation of the estimation of NE and User Equipment device types and/or functions of a block of the process of FIG. 8.

FIG. 10 is a flow diagram of one exemplary implementation of block 850 of the process shown in FIG. 8 for estimating NE/UE types and/or functions. The blocks of the process of FIG. 10 may be implemented by NE type/function estimator 450 of profile announcer 135 of a NE 130 for each UE 110 or other NE. The blocks of FIG. 10 may be repeated upon the occurrence of block 850 each time the process of FIG. 8 is performed.

The exemplary process may include profile announcer 135 obtaining a list of configuration parameters for each other NE 130 and each UE 110 (block 1000). As described with respect to block 820 above, NEs 130 and UEs 110, within n hops away (e.g., one hop) from the NE 130 that is associated with the profile announcer 135, may broadcast their respective personality profiles. The configuration parameters for each other NE and each UE may then be extracted from the received personality profiles by profile announcer 135 and assembled as a list of configuration parameters for each of the other NEs 130 and each UE 110 that is within n hops from the NE 130.

Profile Announcer 135 compares each list against pre-defined or previously known NE/UE parameter templates (block 1010) and estimates the type/function for each NE and UE and groups each NE and UE with NEs or UEs of similar type/function (block 1020). The comparison may be made between the labels of the configuration parameters (e.g., device type, technology, DSS, etc.) and the values assigned to each of the configuration parameters and the labels and values of the configuration parameters of the previously known or pre-defined NE/UE templates. For example, if a NE of device type/function X has the following pre-defined NE template: config_parameter_1=A, config_parameter_2=B, and config_parameter_3=C, and a configuration parameter list of a NE 130 has an identical configuration (config_parameter_1=A, config_parameter_2=B, and config_parameter_3=C), then NE type/function estimator 450 of the profile announcer 125/135 may estimate that the NE 130 is a NE of device type/function X. In this example, the NE 130 estimated to be of device type/function X would be grouped with other NEs 130 also estimated to be of device type/function X.

Figure 11:
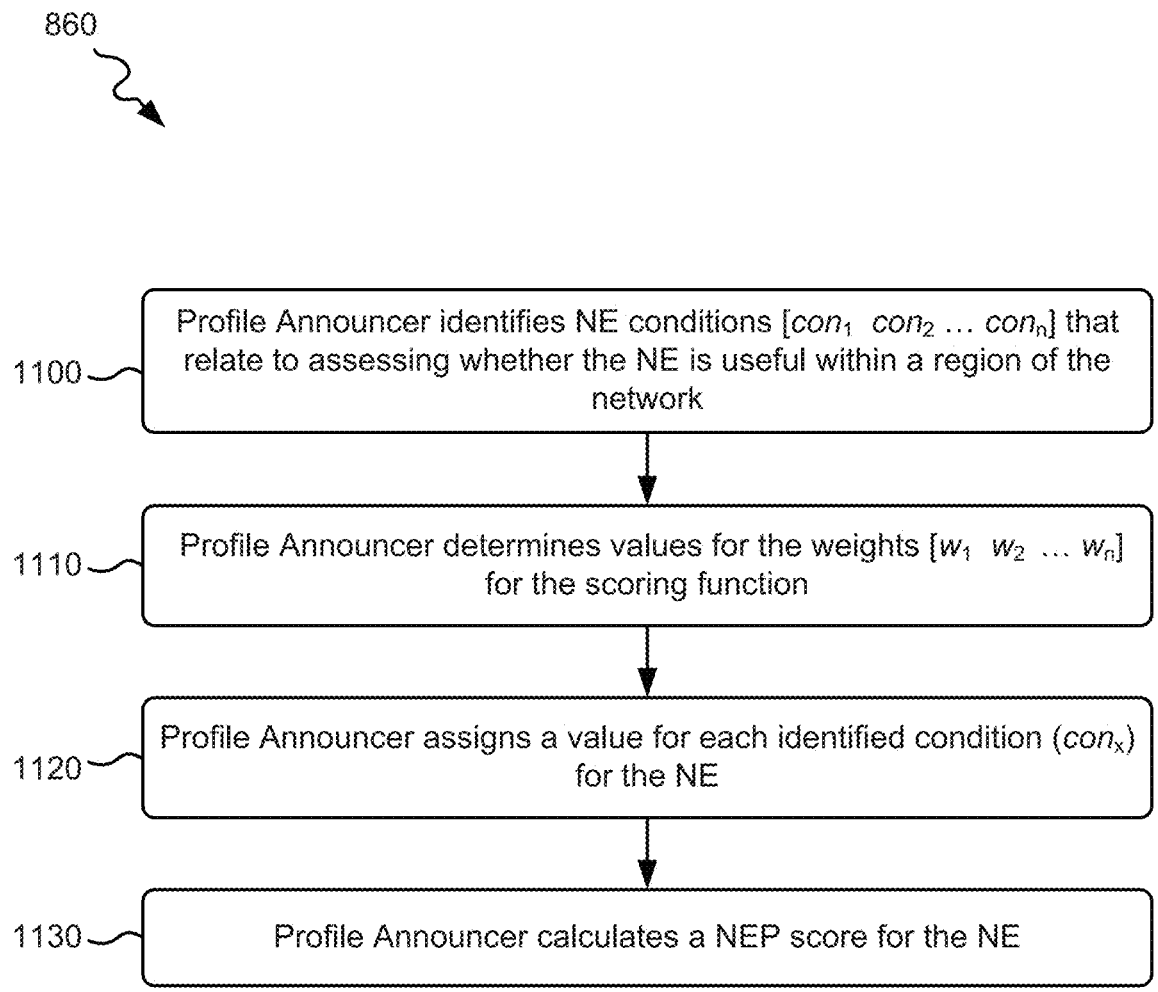
FIG. 11 is a flow diagram of one exemplary implementation of the determination of a NE's NE Profile score in another block of the process of FIG. 8.

FIG. 11 is a flow diagram of one exemplary implementation of block 860 of the process shown in FIG. 8 for determining a NE 130's NEP score. The blocks of FIG. 11 may be implemented by a profile announcer 135 and may be repeated upon each occurrence of block 860 when the process of FIG. 8 is performed.

The exemplary process may include profile announcer 135 identifying NE conditions [$con_1$ $con_2$ ... $con_n$] that relate to whether the NE 130 is useful within a region of network 115 (block 1100). The "useful" status of a NE 130 may relate to the following factors: 1) how isolated or non-isolated the NE 130 is within the region of the network 115; 2) how necessary or unnecessary the NE 130 is within the region of network 115; and/or 3) how efficient or inefficient the NE 130 is within network 115. A NE 130 may be determined to have a high useful status if the NE 130 is non-isolated within network 115, is necessary within the region of the network 115, and/or is highly efficient. Various different performance indicators, such as, for example, usage frequency, failure rate, bandwidth, throughput, latency, jitter, and packet loss, and NE local routing information may be compared with specific NE conditions con), that relate to whether a given NE 130 is useful (i.e., non-isolated, necessary, efficient). NE conditions that relate to efficiency include usage frequency, failure rate, latency, jitter, and packet loss. A highly efficient NE 130, thus, may have a high usage frequency with a low failure rate, a low latency, a low jitter, and a low packet loss. In one implementation, the identified conditions may include one or more of the following: $con_1$=a number of other NEs 130 that are one hop away from the NE 130, $con_2$=a number of unique types of NEs 130 that are one hop away from the NE 130, and $con_3$=a number of unique UE types that are one hop away from the NE 130. Other conditions $con_x$, that may be based on the performance indicators described above (e.g., usage frequency, failure rate, bandwidth, throughput, latency, jitter, and packet loss) and/or the NE local routing information, may additionally or alternatively be used in the NEP scoring of block 1130 below. The NEP scoring function can be designed such that the NEP score increases upon occurrence of each of the conditions $con_1$, $con_2$, ... $con_n$ that relate to the NE 130's usefulness (i.e., non-isolated, necessary, and/or efficient).

Profile announcer 135 determines values for the weights [$w_1$ $W_2$] for the scoring function (block 1110). In one implementation, the NEP scoring function may take the form of NEP_score=$con_1*w_1+con_2*w_2+ \ldots +con_n*w_n$, where the weights [$w_1$ $w_2$ ... $w_n$] may include numerical weighting values that can be assigned based on the relative significance that the particular condition has for assessing whether the NE 130 is useful within network 115. For example, $con_1$ may be assigned a weighting factor of 5.0, and $con_2$ may be assigned a weighting factor of 2.1.

Profile Announcer 135 assigns a value for each identified condition ($con_x$) for the NE 130 (block 1120). As one example, the NE 130 may have five other NEs 130 that are one hop away, two unique types of NEs 130 that are one hop away, and four unique UE types that are one hop away. In this example, a value of 5 is assigned to $con_2$ a value of 2 is assigned to $con_2$, and a value of 4 is assigned to $con_3$.

Profile announcer 135 calculates a NEP score for the NE 130 (block 1130). In the implementation already described, the NEP scoring function may take the following form:

$$NEP\_score=con_1*w_1+con_2*w_2+\ldots +con_n*w_n \qquad \text{Eqn. (1)}$$

In the scoring function implementation of Eqn. (1), the values for each identified condition con), determined in block 1120 may be multiplied by its respective weighting value $w_x$ determined in block 1110 to calculate a total NEP score for the NE 130. Other scoring functions, including other weighted scoring functions, may be used herein instead of, or in addition to, the scoring function of Eqn. (1).

Figure 12A:
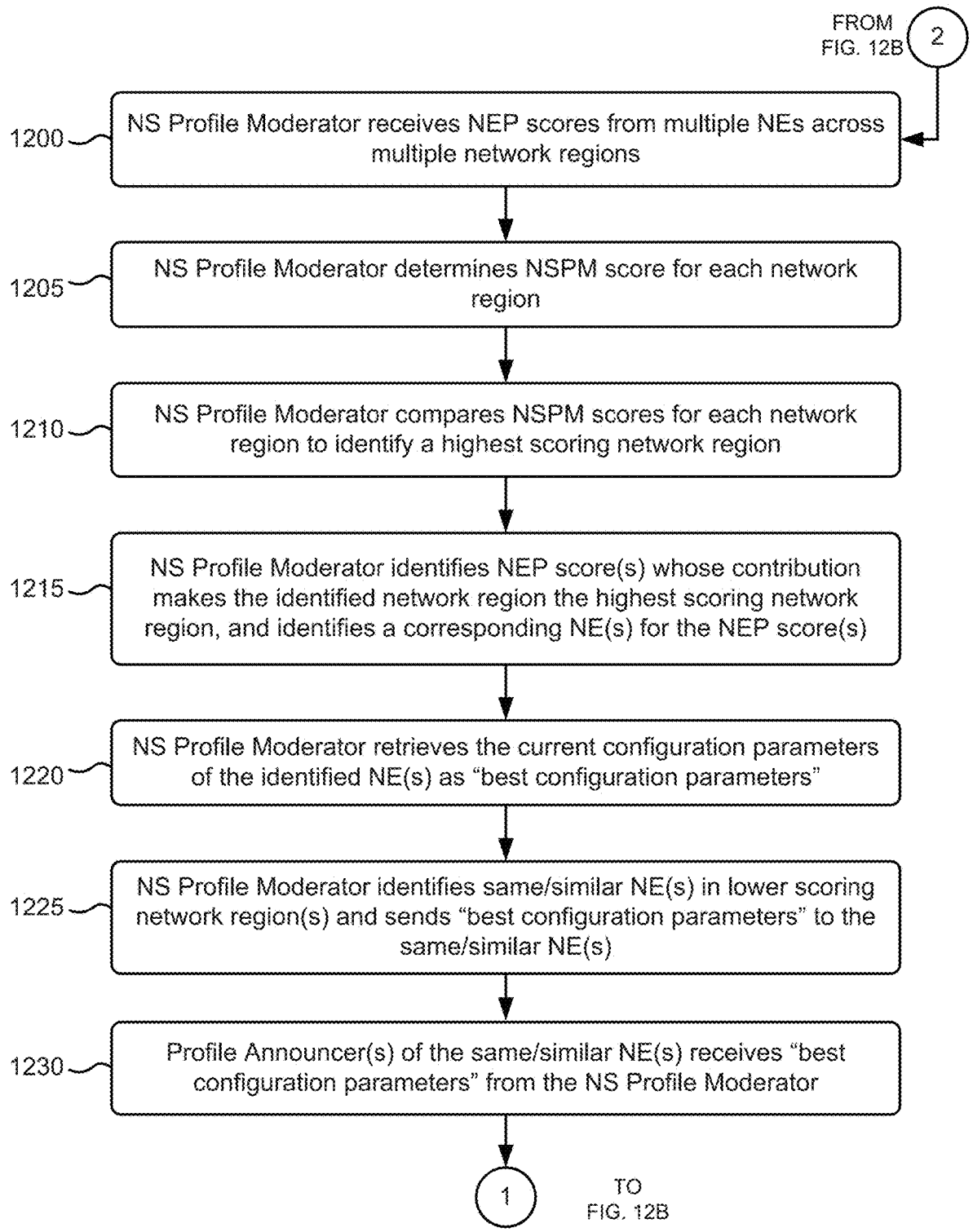
FIGS. 12A and 12B are flow diagrams of an exemplary process for determining network region scores, based on NE profile scores received from profile announcers, and using those network region scores as a basis for modifying configuration parameters of network elements in lower scoring network regions of the network of FIG. 1.
Figure 12B:
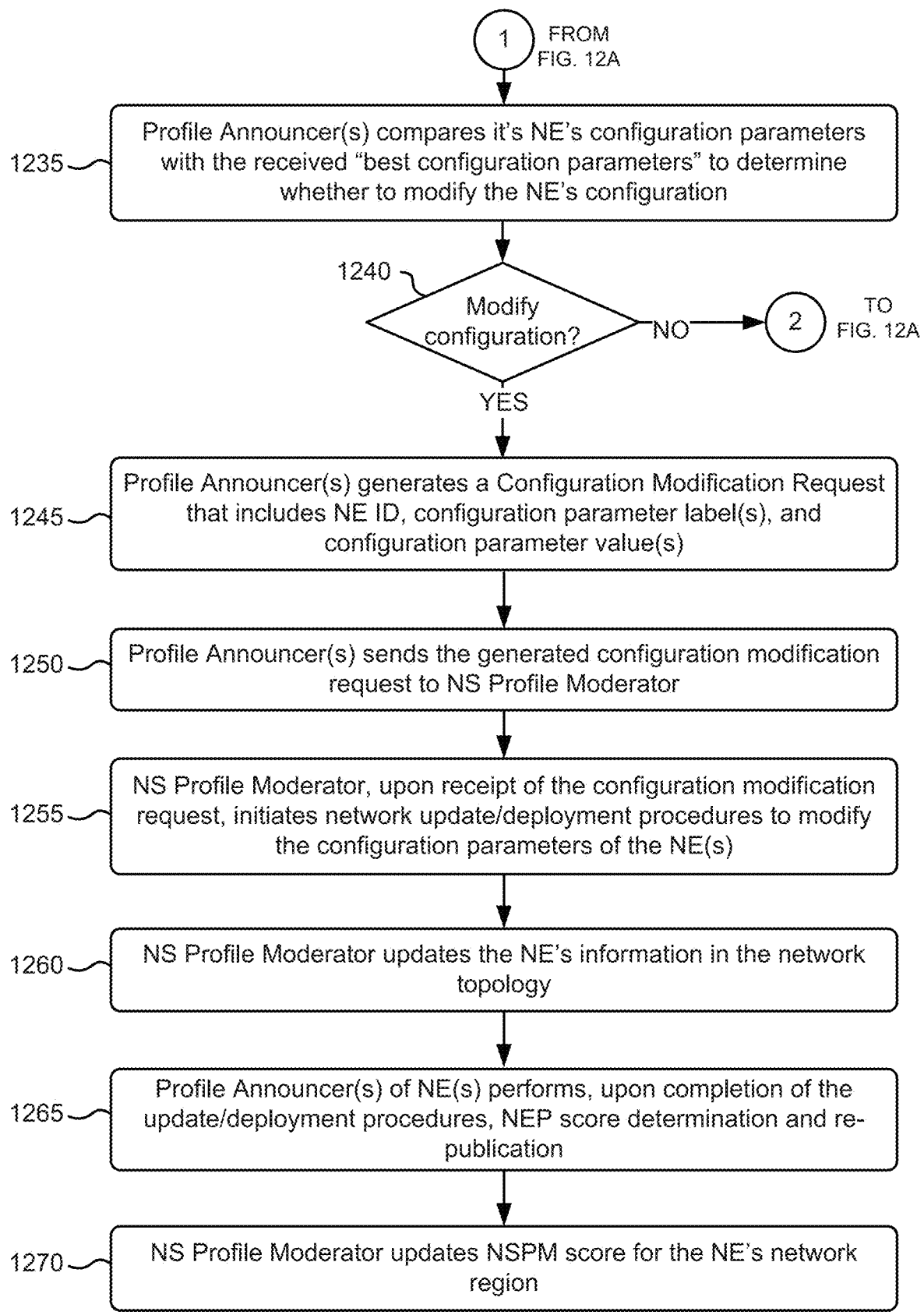

FIGS. 12A and 12B are flow diagrams of an exemplary process for determining network region scores, based on NEP scores received from profile announcers 135, and using those network region scores as a basis for possibly modifying configuration parameters of NEs in lower scoring network regions. The exemplary process of FIGS. 12A and 12B may be implemented by a NS profile moderator 140. The exemplary process of FIGS. 12A and 12B is described below with reference to the exemplary messaging/operations/data flow diagrams of FIGS. 13A and 13B. The exemplary process of FIGS. 12A and 12B may be repeated at certain instances of time. For example, the exemplary process of FIGS. 12A and 12B may be repeated periodically based on NEP scores received at that time by NS profile moderator 140.

Figure 13A:
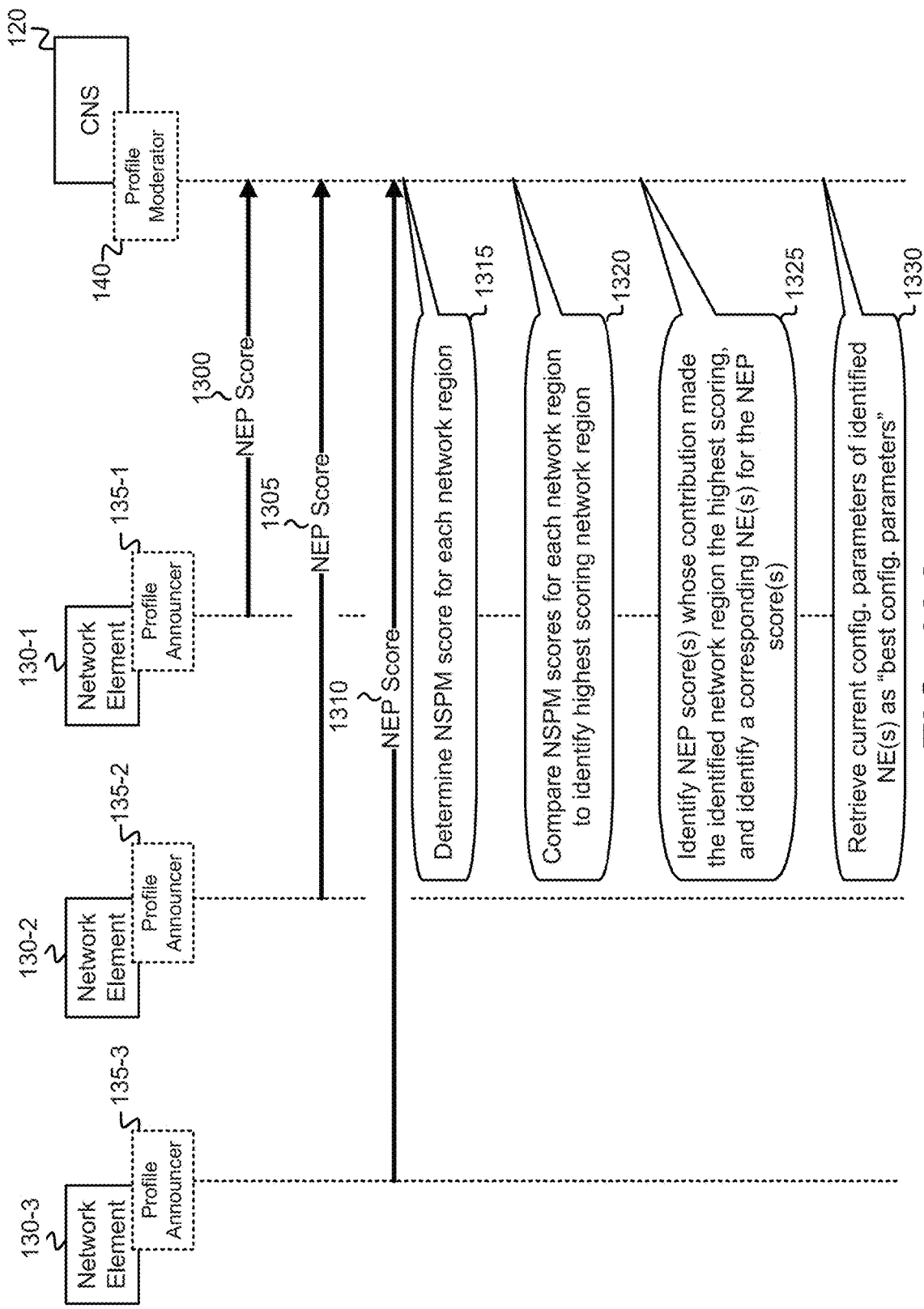
FIGS. 13A and 13B depict exemplary operations, messages, and data flows associated with the exemplary process of FIGS. 12A and 12B.

The exemplary process may include NS profile moderator 140 receiving NEP scores from multiple NEs 130 across multiple network regions (block 1200). As described with respect to blocks 860 and 870 of FIG. 8, each NE 130 within network 115 may determine a current NEP score, and publish the current NEP score to NS profile moderator 140 at certain instances of time (e.g., periodically). FIG. 13A shows a simplified example in which profile moderator 140 of CNS 120 receives a NEP score 1300 from a profile announcer 135-1 of a NE 130-1, a NEP score 1305 from a profile announcer 135-2 of a NE 130-2, and a NEP score 1310 from a profile announcer 135-3 of a NE 130-3.

NS profile moderator 140 determines a Network System Profile Moderator (NSPM) score for each network region (block 1205). Determining the NSPM score for a given network region in network 115 may include applying a scoring function to the NEP scores for all of the NEs 130 within the given network region to generate the NSPM score. In one implementation, the NSPM scoring function may include an unweighted summing function that sums all of the NEP scores for the NEs 130 within each network region. As a simplified example, if network region 1 includes NE 130-1, 130-2, 130-3 and 130-4, then the $NSPM_{region\ 1}$ score for network region 1 may include the sum of the NEP score for each of NEs 130-1, 130-2, 130-3, and 130-4 ($NSPM_{region\ 1}$=NEP_score$_1$+NEP_score$_2$+NEP_score$_3$+NEP_score$_4$). As a further simplified example, if network region 2 includes NE 130-5, 130-6, and 130-7, then the NS $PM_{region\ 2}$ score for network region 2 may include the sum of the NEP score for each of NEs 130-5, 130-6, and 130-7 ($NSPM_{region\ 2}$=NEP_score$_5$+NEP_score$_6$+NEP_score$_7$). In another implementation, the NSPM score for each network region may include a weighted sum of the NEP scores for the network elements within each network region. FIG. 13A depicts profile moderator 140 determining 1315 a NSPM score for each network region in the network 115 (not shown).

NS profile moderator 140 compares the determined NSPM scores for each network region to identify a highest scoring network region (block 1210), and identifies one or more NEP scores whose contribution made the identified network region the highest scoring network region, and identifies a corresponding NE for each of the identified NEP scores (block 1215). In a simplified example in which there are two networks regions, network region 1 includes four NEs 130: a NCU with a NEP score of 456 and three FHGWs with each having a same first set of configuration parameters and a same NEP score of 123. Network region 1 has a NSPM score of 825 (i.e., 456+123*2). Network region 2 includes four NEs 130: a NCU with a NEP score of 456 and three FHGWs with each FHGW having a same second set of configuration parameters and a same NEP score of 66. The second set of configuration parameters of the FHGWs in network region 2 is different than the first set of configuration parameters of the FHGWs in network region 1. Network region 2 has a NSPM score of 654 (i.e., 456+66*3). In this simplified example, a comparison of the NSPM scores for network region 1 and network region 2 identifies network region 1 as having the higher NSPM score (825 vs. 654). An analysis of the NEP scores for each network region further identifies the NEP scores (e.g., 123) for the three FHGWs in network region 1, having a same set of configuration parameters, as making network region 1's NSPM score higher than network region 2's NSPM score. The three FHGWs in network region 2 each have a lower NEP score (e.g., 66) resulting in a lower NSPM score relative to network region 1's NSPM score. FIG. 13A shows profile moderator 140 comparing 1320 the NSPM scores for each network region to identify a highest scoring network region, and identifying 1325 a NEP score(s) whose contribution made the identified network region the highest scoring, and identifying a corresponding NE(s) for the NEP score(s).

NS profile moderator 140 retrieves the current configuration parameters of the identified NEs as the "best configuration parameters" (block 1220), and identifies a same or similar NEs in a lower scoring network region(s) and sends the "best configuration parameters" to the same or similar NEs (block 1225). Returning to the simplified example of block 1210, the three FHGWs in network region 1, having a same set of configuration parameters, have been identified as making network region 1's NSPM score higher than network region 2's NSPM score. Therefore, NS profile moderator 140 retrieves the current set of configuration parameters for one of the three FHGWs in network region 1, and identifies the retrieved set of configuration parameters as the "best configuration parameters." In this simplified example, NS profile moderator 140 also identifies the three FHGWs in network region 2 as being the same or similar to the FHGW in network region 1 and sends the "best configuration parameters" for the FHGW in network region 1 to each of the FHGWs in network region 2. FIG. 13A shows an example of profile moderator 140 retrieving 1330 the current configuration parameters of the identified NEs as "best configuration parameters." FIG. 13B further shows profile moderator 140 identifying 1335 a same or similar NEs in lower scoring network regions and sending a message 1340 that includes the best configuration parameters to the NE 130-2 that was identified as a same or similar NEs.

Figure 13B:
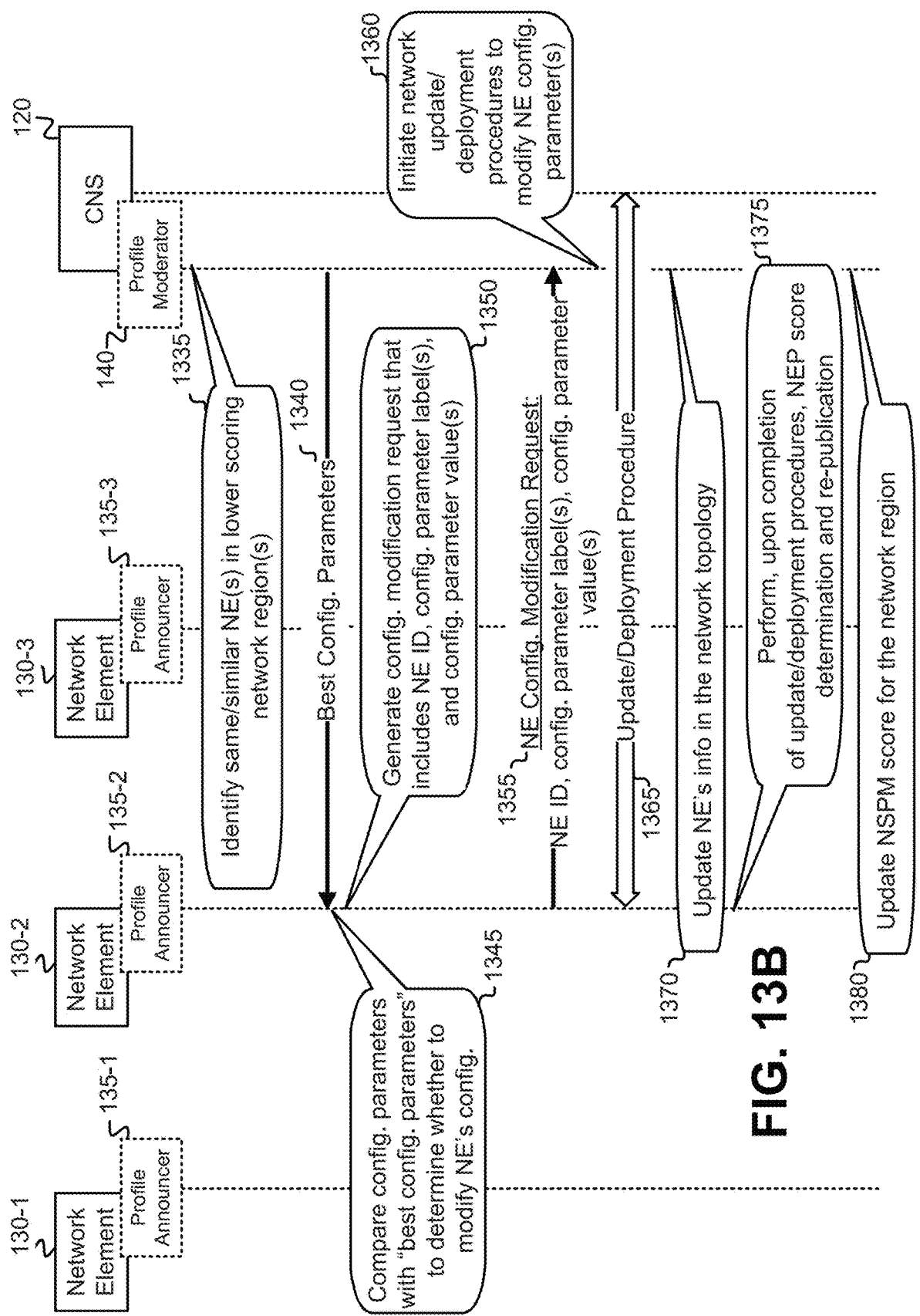

Profile announcer(s) 135 of the same/similar NE(s) receives the "best configuration parameters" from the NS profile moderator 140 (block 1230) and compares its NE's configuration parameter with the received "best configuration parameters" to determine whether to modify the NE 130's configuration (block 1235). For example, a comparison of the "best configuration parameters" with the NE 130's configuration parameters determines that the NE 130's configuration parameters have the smart phone interface (intfcSP) and the personal computer interface (intfcPC) disabled, whereas the received "best configuration parameters" have those interfaces enabled. Profile announcer 135, therefore, determines that the NE's configuration parameters should be modified to enable the NE 130's interfaces intfcSP and intfcPC. FIG. 13B depicts NE 130-2, upon receipt of the message 1340 that includes the "best configuration parameters," comparing 1345 the NE 130-2's current configuration parameters with the received "best configuration parameters."

If the profile announcer 135 of the same/similar NEs determines that the NE's configuration parameters should not be modified (NO—block 1240), then the exemplary process returns to block 1200 to begin the next iteration of NSPM score comparison with possibly updated NEP scores from the NEs 130. A comparison of the "best configuration parameters" with the NE's current configuration parameters may determine that the configuration parameters of the NE 130 that are different than the "best configuration parameters" cannot, or should not, be modified. In such cases, profile announcer 135 of the same/similar NE(s) determines that the NE 130's configuration parameters should not be modified.

If the profile announcer 135 of the same/similar NEs determines that the NE's configuration parameters should be modified (YES—block 1240), then the profile announcer 135 of the same/similar NEs generates a Configuration Modification Request that includes an NE identifier (ID), a configuration parameter label for each of the NE's configuration parameters to be modified, and a configuration parameter value for the configuration parameter (block 1245). The profile announcer(s) 135 of the same/similar NEs sends the generated Configuration Modification Request to the NS profile moderator 140 (block 1250). Returning to the example of block 1235, the profile announcer 135 generates a Configuration Modification Request that includes an ID for the NE 130, a configuration parameter label "intfcSP," a value of "enabled" for the configuration parameter label "intfcSP," a configuration parameter label "intfcPC," and a value of "enabled" for configuration parameter label "intfcPC." FIG. 13B shows NE 130-2 generating 1350 a Configuration Modification Request that includes an ID of the NE 130-2, a configuration parameter label(s) for the configuration parameter(s) to be modified, and a configuration parameter value(s) for the configuration parameter(s) to be modified. FIG. 13B further shows NE 130-2 sending the generated NE configuration modification request 1355 to NS profile moderator 140 at CNS 120.

NS profile moderator 140, upon receipt of the Configuration Modification Request, initiates network update/deployment procedures to modify the configuration parameters of the NEs (block 1255). NS profile moderator 140 sends a message to CNS 120 to initiate the network update/deployment procedures to modify the NE 130's configuration parameters. Upon receipt of the message from NS profile moderator 140, CNS 120 engages in update/deployment procedures with the NE 130 to modify the particular configuration parameters. In the case of configurable settings at the NE 130, CNS 120 may modify the configurable settings from the original settings to the new settings. In the case of functional modifications, CNS 120 may engage in a deployment procedure for modifying the software or firmware of the NE 130. FIG. 13B depicts profile moderator 140 initiating 1360 network update/deployment procedures to modify the NE 130-2's configuration parameters based on the content of the NE configuration modification request 1355. Subsequent to initiation by profile moderator 140, CNS 120 engages in an update/deployment procedure 1365 with the NE 130-2 to modify the requested configuration parameters of the NE 130-2.

NS profile moderator 140, upon completion of the update/deployment procedures, updates the NE's information in the network topology (block 1260). NS profile moderator 140 updates the stored network topology information based on the modified configuration parameters. FIG. 13B depicts profile moderator 140 updating 1370 NE 130-2's information in the stored network topology information.

Profile announcer(s) 135 of the same/similar NEs perform, upon completion of the update/deployment procedures, NEP score determination and republication (block 1265). Profile announcer(s) 135 repeats blocks 860 and 870 to update the NEP score for the NE 130 and republishes the updated NEP score to NS profile moderator 140. FIG. 13B shows profile announcer 135-2 associated with the NE 130-2 performing 1375, upon completion of the update/deployment procedures to modify the NE 130-2's configuration parameters, NEP score determination and re-publication.

NS profile moderator 140 updates the NSPM score for the NE's network region (block 1270). Using the updated NEP score for the NE 130 from block 1270, NS profile moderator 140 recalculates the NSPM score for the NE 130's network region using the NSPM scoring function described with respect to block 1205 above. FIG. 13B depicts profile moderator 140 updating 1380 the NSPM score for the network region in which NE 130-2 resides.

Figure 14A:
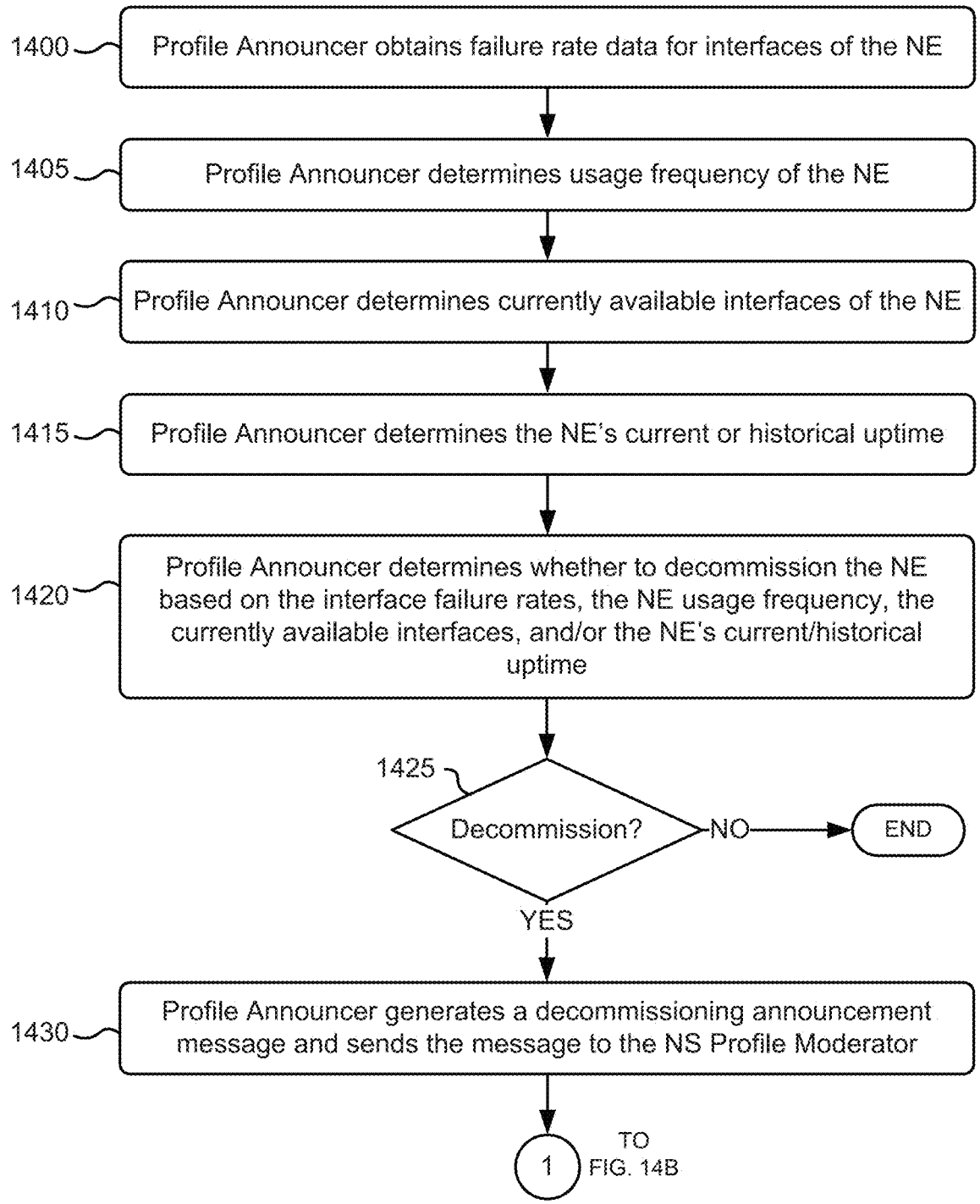
FIGS. 14A and 14B are flow diagrams of an exemplary process for decommissioning a NE in the network of FIG. 1.
Figure 14B:
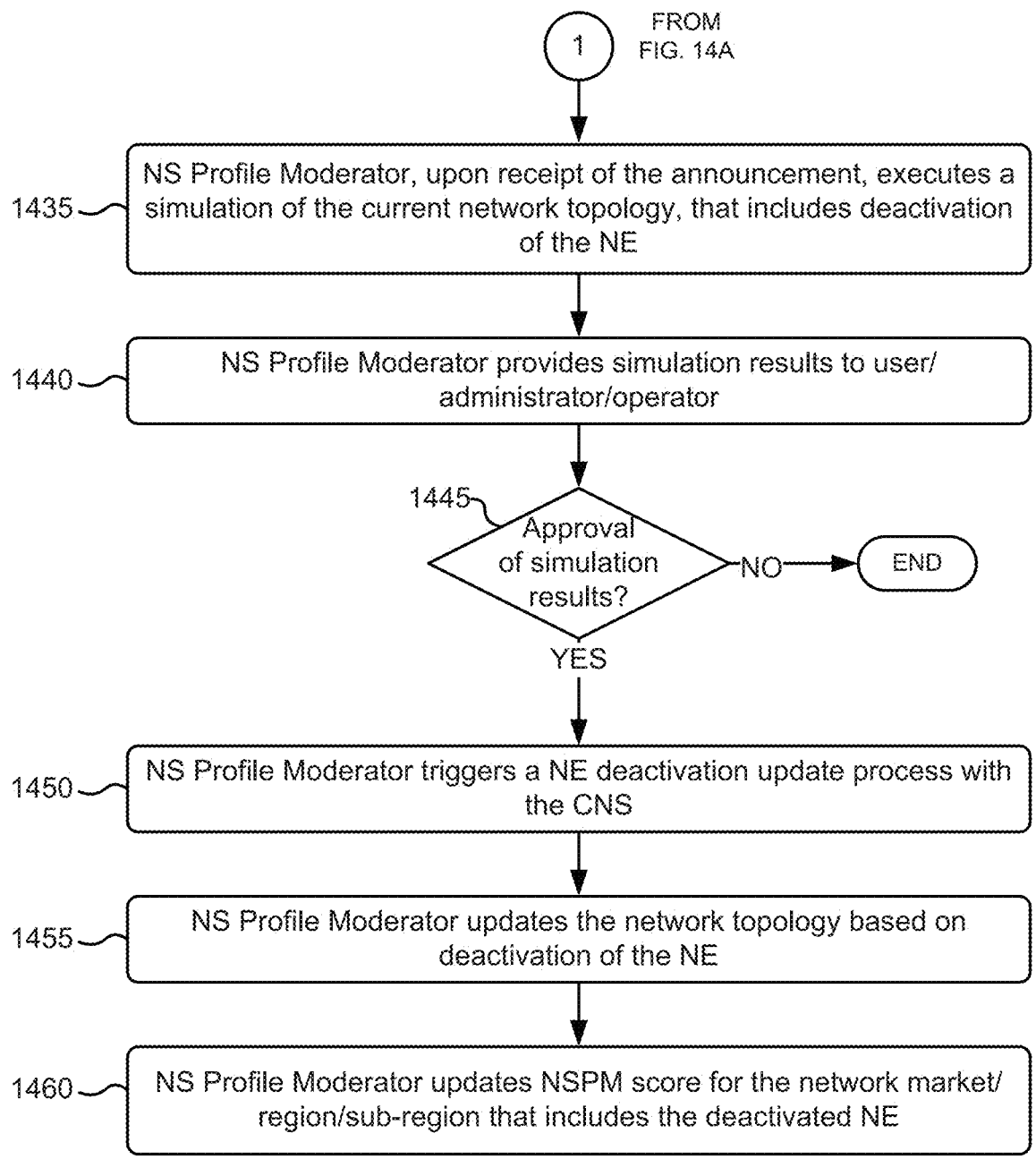

FIGS. 14A and 14B are flow diagrams of an exemplary process for decommissioning a NE 130. The exemplary process of FIGS. 14A and 14B may be implemented by a profile announcer 135 associated with a NE 130, in conjunction with NS profile moderator 140. The exemplary process of FIGS. 14A and 14B is described below with reference to the exemplary messaging/operations/data flow diagrams of FIG. 15. The exemplary process of FIGS. 14A and 14B may be repeated at certain instances of time, such as, for example, periodically or when interface failure rates, NE usage frequency, and/or NE uptime reach threshold levels.

Figure 15:
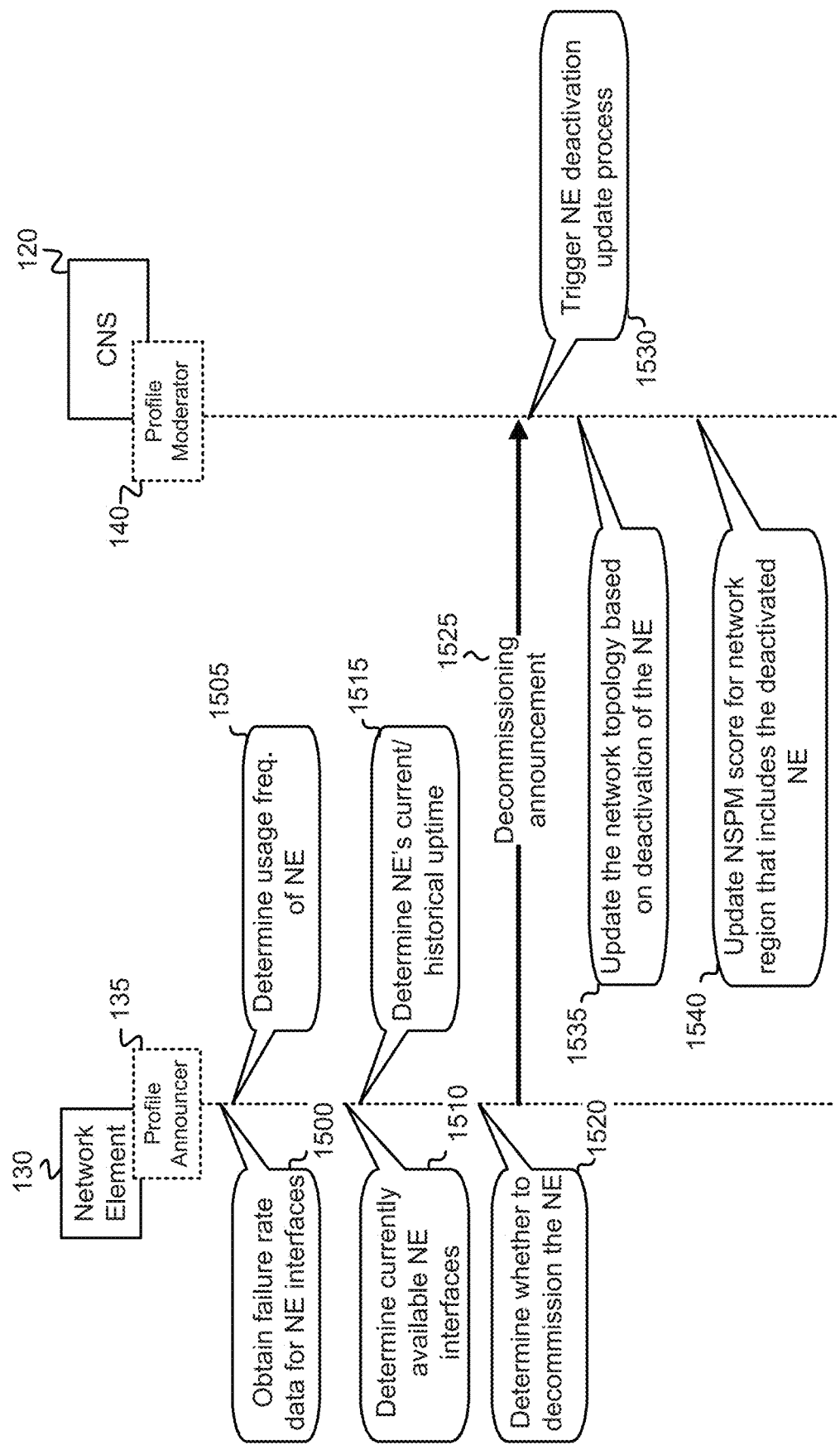
FIG. 15 depicts exemplary operations, messages, and data flows associated with the exemplary process of FIGS. 14A and 14B.

The exemplary process may include profile announcer 135 obtaining failure rate data for interfaces of the NE 130 (block 1400), determining a usage frequency of the NE 130 (block 1405), determining currently available interfaces of the NE 130 (block 1410), and determining the NE's current or historical uptime (block 1415). The failure rate data for the interfaces of the NE 130 may include a rate of failure (e.g., in percentage of packets transmitted) for each interface of the NE 130 or UE 110. For example, a gateway NE may have interfaces $intfc_1$ through $intfc_n$, and $intfc_2$ may have a 0.75% failure rate and $intfc_5$ may have a 0.3% failure rate. The usage frequency of the NE 130 may include a number of occurrences of uses (e.g., number of packets, number of packet sessions) of the NE 130 over a period of time. In some implementations, the usage frequency for the NE 130 may be classified as "extremely high," "high," "low," or "very low" based on predefined or preconfigured threshold comparisons. The currently available interfaces of the NE 130 are those interfaces currently operable for use (i.e., not in a failure state) and that are enabled for use. The NE's current uptime may include a time duration over which the NE has currently been in an operating or operational state. The NE's historical uptime may include a historical record of time intervals (e.g., dates and times) over which the NE was operating or in an operational state. FIG. 15 depicts profile announcer 135, associated with a NE 130, obtaining 1500 failure rates for the NE 130's interfaces and determining 1505 a usage frequency of the NE 130. FIG. 15 further shows profile announcer 135 determining 1510 currently available interfaces of NE 130, and determining 1515 the NE 130's current and/or historical uptime.

Profile announcer 135 determines whether to decommission the NE 130 based on the determined interface failure rates, usage frequency, currently available interfaces, and current or historical uptime of the NE (block 1420). Profile announcer 135 may compare the determined interface failure rates, usage frequency, currently available interfaces, and current or historical uptime of the NE 130 against minimum or maximum threshold values. For example, decommissioning may be warranted if the interface failure rate for the interfaces of the NE 130 exceeds x%. As another example, decommissioning of the NE 130 may be warranted if there are fewer than y currently available interfaces at the NE 130. As a further example, the length of a current uptime period for the NE 130 may be compared with a minimum threshold period of time (e.g., greater than or equal to 3.5 uptime hours), or the total length of historical uptime for the NE 130 may be compared with a minimum threshold amount of total uptime over a specified time interval (e.g., 23.5 total uptime hours out of the last 24 hours, 30.5 total uptime days out of the past 31 days, etc.).

If Profile announcer 135 determines that the NE 130 should not be decommissioned (NO—block 1425), then the exemplary process ends. If the profile announcer 135 determines that the NE 130 should be decommissioned (YES—block 1425), then the profile announcer 140 generates a decommissioning announcement message and sends the message to the NS profile moderator 140 (block 1430). The decommissioning announcement message may include an ID of the NE 130 that is to be decommissioned. FIG. 15 shows profile announcer 135 associated with NE 130 determining whether to decommission the NE 130 and if decommissioning of NE 130 is determined to be warranted, profile announcer 135 sends a decommissioning announcement message 1515 to NS profile moderator 140.

NS profile moderator 140, upon receipt of the announcement message, executes a simulation of a network, having the current network topology, that includes a simulated deactivation of the NE (block 1435), and NS profile moderator 140 provides results of the simulation to a user/administrator/operator (block 1440). As described with respect to blocks 1620, 1630, and 1640 below, NS profile moderator 140 may update stored network topology information based on a simulated deactivation of the NE and store the updated network topology as a network simulation model. Using the updated network simulation model, NS profile moderator 140 may execute a simulation of the updated network to observe the effect of deactivation and removal of the NE 130 from the network. The simulation may output performance parameters that may be analyzed to observe the simulated effect of deactivation and removal of the NE 130. The results of the simulation may be provided to a user, administrator, or operator associated with network 115 in a format that is viewable by the user, administrator, or operator.

If NS profile moderator 140 determines that the user/administrator/operator disapproves of the simulation results (NO—block 1445), then the exemplary process may end.

After viewing the results of the executed simulation, the user, administrator, or operator may decide that deactivation of the NE 130 has a sufficiently negative impact on the network 115's performance parameters as to preclude continuing with the actual deactivation of the NE 130. In this case, the NS profile moderator 140 does not trigger a deactivation update process, and the NE 130 is left as an operational node within network 115.

If NS profile moderator 140 determines that the user/administrator/operator approves of the simulation results (YES—block 1445), then NS profile moderator 140 triggers a NE deactivation update process with the CNS 120 (block 1450), and updates the network topology based on deactivation of the NE 130 (block 1455). After viewing the results of the simulation, the user, administrator, or operator may decide that deactivation of the NE 130 does not have a sufficient impact on the network 115's performance parameters such that deactivation of the NE 130 should be prevented. In this case, the NS profile moderator 140 continues with the deactivation update process in blocks 1450-1460. Upon triggering of the NE deactivation process by NS profile moderator 140, CNS 120 engages in a NE deactivation process with the NE 130 to modify the NE's operational status within network 115. NS profile moderator 140 (or CNS 120 itself), upon completion of the NE deactivation process, updates the stored network topology information for the network 115. The updated information may represent network topology that excludes the deactivated NE 130. FIG. 15 illustrates profile moderator 140 triggering 1530, upon receipt of the decommissioning announcement message 1525 from profile announcer 135, the NE deactivation process to deactivate the NE 130. FIG. 15 further shows profile moderator 140 updating 1535 the network topology based on the deactivation of the NE 130.

In some implementations, the simulation and approval performed in blocks 1435, 1440, and 1445 described above may be omitted from the process of FIGS. 14A and 14B. In such implementations, NS profile moderator 140 may, without executing a simulation, trigger a NE deactivation update process for the identified NE 130 directly following receipt of the decommissioning announcement message from the profile announcer 135 associated with the NE 130.

NS profile moderator 140 updates the NSPM score for the network region that includes the deactivated NE (block 1460). NS profile moderator 140 may use the NSPM scoring function described with respect to block 1205 above to update the NSPM score for the network region in which the deactivated NE 130 resides. FIG. 15 shows NS profile moderator 140 updating 1540 the NSPM score for the network region that includes the deactivated NE 130.

Figure 16:
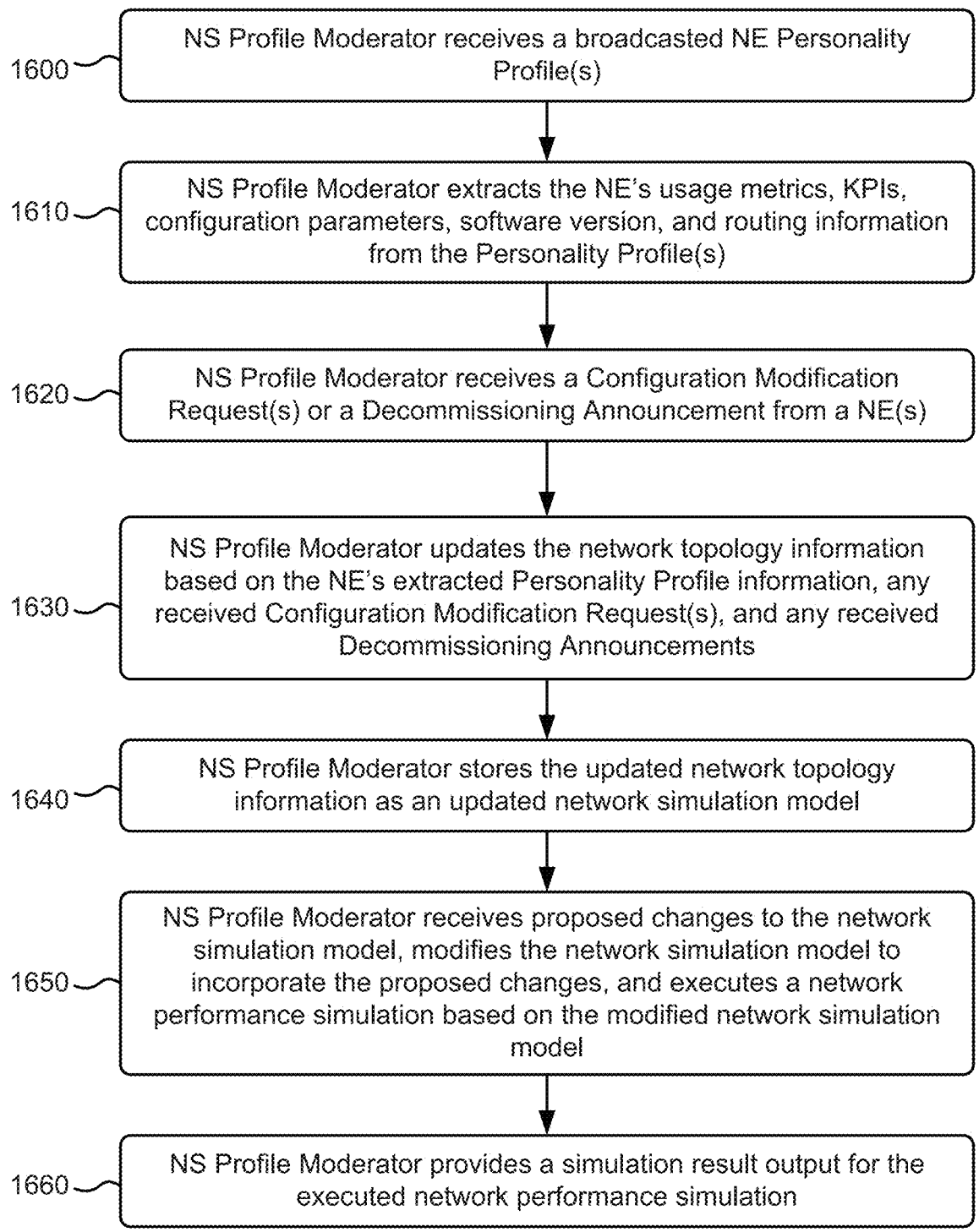
FIG. 16 is a flow diagram of an exemplary process for updating a network simulation model associated with the network of FIG. 1 based on broadcast personality profiles and NE configuration modification requests.

FIG. 16 is a flow diagram of an exemplary process for updating a network simulation model associated with network 115 based on broadcast personality profiles and based on NE configuration modification requests. The exemplary process of FIG. 16 may be implemented by NS profile moderator 140 in conjunction with one or more profile announcers 135 associated with respective NEs 130. The exemplary process of FIG. 16 may be repeated at certain instances of time, such as, for example, periodically.

The exemplary process may include NS profile moderator 140 receiving a broadcasted NE personality profile (block 1600) and extracting the NE's usage metrics, KPIs, configuration parameters, software version, and routing information from the personality profile(s) (block 1610). The NE personality profile may have been generated and broadcast by a profile announcer 135 associated with a NE 130 in, for example, block 660 of the process of FIG. 6. NS profile moderator 140 may receive multiple personality profiles broadcast from multiple different NEs 130 over a given period of time. NS profile moderator 140 receives a Configuration Modification Request or a decommissioning announcement message from a NE 130 (block 1620). The Configuration Modification Request may have been generated and transmitted by a profile announcer 135 associated with a NE 130 in, for example, blocks 1245 and 1250 of the process of FIGS. 12A and 12B. NS profile moderator 140 may receive multiple Configuration Modification Requests from multiple different NEs 130 over the given period of time. The decommissioning announcement message may have been generated and transmitted by a profile announcer 135 associated with a NE 130 in, for example, block 1430 of the process of FIGS. 14A and 14B.

NS profile moderator 140 updates the network topology information based on the NE 130's extracted personality profile, any received Configuration Modification Request(s), and any received decommissioning announcement messages (block 1630) and stores the updated network topology information as a part of a network simulation model (block 1640). The network topology information stored in CNS 120 may include various types of data that describes the topology of network 115. For example, the network topology information may include data that describes the interconnections between NEs 130 within network 115, including which interfaces of each NE 130 connect to which interfaces of other NEs 130, and data that describes the KPIs of the NEs 130 and the links between the NEs 130.

NS profile moderator 140 receives proposed changes to the network simulation model, modifies the network performance simulation model to incorporate the proposed changes, and executes a simulation based on the modified network simulation model (block 1650). NS profile moderator 140 then provides a simulation result output for the executed network performance simulation (block 1660). A user/administrator/operator of network 115 may supply hypothetical proposed changes to one or more aspects of network 115. The proposed changes correspond to changes to the network simulation model stored in block 1640. NS profile moderator 140, upon receipt of the proposed changes, modifies appropriate parameters of the network simulation model to incorporate the proposed changes and stores the modified network simulation model. NS profile moderator 140 may then execute a network performance simulation, using the modified network simulation model, to generate simulation results that include simulated performance parameter measurements associated with the NEs 130 and links in network 115.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 8, 10, 11, 12A, 12B, 14A, 14B, and 16, and sequences of operations, messages, and data flows with respect to FIGS. 7, 9, 13A, 13B, and 15, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining configuration parameters for multiple network elements of a network;
   obtaining first scores that assess a level of efficiency and a level of isolation for each of the multiple network elements;
   identifying, based on the configuration parameters and the first scores, a first network element of the multiple network elements for modifying the identified first network element's configuration;
   identifying, based on the first scores, a second network element of the multiple network elements;
   obtaining, from the configuration parameters for the multiple network elements, one or more of the identified second network element's configuration parameters; and
   modifying the first network element's configuration based on the one or more of the second network element's configuration parameters.

2. The method of claim 1, wherein the first scores assess the level of efficiency based on whether each of the multiple network elements has a high usage frequency and one or more of a low failure rate, a low latency, a low jitter, or a low packet loss.

3. The method of claim 1, wherein the first scores assess the level of isolation based on a number of other network elements that are a certain number of hops away from each of the multiple network elements.

4. The method of claim 1, wherein the first scores assess the level of isolation based on a number of unique types of network elements that are a certain number of hops away from each of the multiple network elements.

5. The method of claim 1, wherein the first scores assess the level of isolation based on a number of unique user equipment (UE) types that are connected to each of the multiple network elements.

6. The method of claim 1, further comprising:
   identifying multiple network regions that encompass the multiple network elements,
   wherein the first network element resides in a first network region of the multiple network regions and wherein the second network element resides in a second network region of the multiple network regions; and
   identifying, based on the first scores, the second network region of the multiple network regions, wherein identifying the second network element further comprises:
      identifying the second network element from among other network elements in the identified second network region based on the first scores.

7. The method of claim 1, further comprising:
   determining, based on the first scores, second scores for multiple network regions that encompass the multiple network elements; and
   identifying, based on the second scores, a first network region of the multiple network regions as a highest scoring network region and a second network region of the multiple network regions as a lower scoring network region among the multiple network regions, wherein the first network element resides in the second network region of the multiple network regions and the second network element resides in the first network region of the multiple network regions,
   wherein identifying the second network element further comprises:
      identifying the second network element from among other network elements in the identified first network region based on the first scores and the second scores.

8. The method of claim 1, further comprising:
   determining, based on the first scores, second scores for multiple network regions that encompass the multiple network elements; and
   comparing the second scores for the multiple network regions among one another to identify a first network region as a highest scoring network region and a second network region as a lowest scoring network region, wherein the first network element resides in the second network region and the second network element resides in the first network region; and
   wherein identifying the second network element further comprises:
      identifying the second network element from among other network elements in the first network region based on the first scores and the second scores.

9. A device, comprising:
   a communication interface configured to:
      obtain configuration parameters for multiple network elements of a network, and
      receive first scores that assess a level of efficiency and a level of isolation for each of the multiple network elements; and
   a processing unit configured to:
      identify, based on the configuration parameters and the first scores, a first network element of the multiple network elements for modifying the identified first network element's configuration,
      identify, based on the first scores, a second network element of the multiple network elements,
      obtain, from the configuration parameters for the multiple network elements, one or more of the identified second network element's configuration parameters, and
      cause the first network element's configuration to be modified based on the one or more of the second network element's configuration parameters.

10. The device of claim 9, wherein the first scores assess the level of efficiency based on whether each of the multiple network elements has a high usage frequency and one or more of a low failure rate, a low latency, a low jitter, or a low packet loss.

11. The device of claim 9, wherein the first scores assess the level of isolation based on one or more of:
   a number of other network elements that are a certain number of hops away from each of the multiple network elements,
   a number of unique types of network elements that are a certain number of hops away from each of the multiple network elements, or
   a number of unique user equipment (UE) types that are connected to each of the multiple network elements.

12. The device of claim 9, wherein the processing unit is further configured to:
   identify multiple network regions that encompass the multiple network elements,
   wherein the first network element resides in a first network region of the multiple network regions and wherein the second network element resides in a second network region of the multiple network regions, and identify, based on the first scores, the second network region of the multiple network regions, wherein identifying the second network element further comprises:
    identifying the second network element from among other network elements in the identified second network region based on the first scores.

13. The device of claim 9, wherein the processing unit is further configured to:
    determine, based on the first scores, second scores for multiple network regions that encompass the multiple network elements; and
    identify, based on the second scores, a first network region of the multiple network regions as a highest scoring network region and a second network region of the multiple network regions as a lower scoring network region among the multiple network regions, wherein the first network element resides in the second network region of the multiple network regions and the second network element resides in the first network region of the multiple network regions,
    wherein, when identifying the second network element, the processing unit is further configured to:
        identify the second network element from among other network elements in the identified first network region based on the first scores and the second scores.

14. The device of claim 9, wherein the processing unit is further configured to:
    determine, based on the first scores, second scores for multiple network regions that encompass the multiple network elements; and
    compare the second scores for the multiple network regions among one another to identify a first network region as a highest scoring network region and a second network region as a lowest scoring network region, wherein the first network element resides in the second network region and the second network element resides in the first network region; and
    wherein, when identifying the second network element, the processing unit is further configured to:
        identify the second network element from among other network elements in the first network region based on the first scores and the second scores.

15. A non-transitory storage medium storing instructions executable by a device with one or more processors, wherein execution of the instructions causes the device to:
    obtain configuration parameters for multiple network elements of a network;
    obtain first scores that assess a level of efficiency and a level of isolation for each of the multiple network elements;
    identify, based on the configuration parameters and the first scores, a first network element of the multiple network elements for modifying the identified first network element's configuration;
    identify, based on the first scores, a second network element of the multiple network elements;
    obtain, from the configuration parameters for the multiple network elements, one or more of the identified second network element's configuration parameters; and
    cause the first network element's configuration to be modified based on the one or more of the second network element's configuration parameters.

16. The non-transitory storage medium of claim 15, wherein the first scores assess the level of efficiency based on whether each of the multiple network elements has a high usage frequency and one or more of a low failure rate, a low latency, a low jitter, or a low packet loss.

17. The non-transitory storage medium of claim 15, wherein the first scores assess the level of isolation based on one or more of:
    a number of other network elements that are a certain number of hops away from each of the multiple network elements,
    a number of unique types of network elements that are a certain number of hops away from each of the multiple network elements, or
    a number of unique user equipment (UE) types that are connected to each of the multiple network elements.

18. The non-transitory storage medium of claim 15, wherein execution of the instructions further causes the device to:
    identify multiple network regions that encompass the multiple network elements,
    wherein the first network element resides in a first network region of the multiple network regions and wherein the second network element resides in a second network region of the multiple network regions; and
    identify, based on the first scores, the second network region of the multiple network regions, wherein identifying the second network element further comprises:
        identifying the second network element from among other network elements in the identified second network region based on the first scores.

19. The non-transitory storage medium of claim 15, wherein execution of the instructions further causes the device to:
    determine, based on the first scores, second scores for multiple network regions that encompass the multiple network elements; and
    identify, based on the second scores, a first network region of the multiple network regions as a highest scoring network region and a second network region of the multiple network regions as a lower scoring network region among the multiple network regions, wherein the first network element resides in the second network region of the multiple network regions and the second network element resides in the first network region of the multiple network regions,
    wherein, when identifying the second network element, execution of the instructions further causes the device to:
        identify the second network element from among other network elements in the identified first network region based on the first scores and the second scores.

20. The non-transitory storage medium of claim 15, wherein execution of the instructions further causes the device to:
    determine, based on the first scores, second scores for multiple network regions that encompass the multiple network elements; and
    compare the second scores for the multiple network regions among one another to identify a first network region as a highest scoring network region and a second network region as a lowest scoring network region, wherein the first network element resides in the second network region and the second network element resides in the first network region; and wherein, when identifying the second network element, execution of the instructions further causes the device to:
   identify the second network element from among other network elements in the first network region based on the first scores and the second scores.

21. A method, comprising:
obtaining configuration parameters for multiple network elements of a network;
receiving first scores that assess a level of efficiency and a level of isolation for each of the multiple network elements;
identifying a network element of the multiple network elements for modifying the identified network element's configuration based on the obtained configuration parameters and the received first scores;
identifying multiple network regions that encompass the multiple network elements;
retrieving, from the obtained configuration parameters based on the first scores, first configuration parameters for a first network region of the multiple network regions, wherein the identified network element resides in a second network region of the multiple network regions; and
sending the first configuration parameters for the first network region to the identified network element in the second network region for modification of the network element's configuration parameters.

22. A method, comprising:
obtaining configuration parameters for multiple network elements of a network;
receiving first scores that assess a level of efficiency and a level of isolation for each of the multiple network elements;
identifying a network element of the multiple network elements for modifying the identified network element's configuration based on the obtained configuration parameters and the received first scores;
determining, based on the first scores, second scores for multiple network regions that encompass the multiple network elements;
identifying, based on the second scores, a first network region of the multiple network regions as a highest scoring network region and a second network region of the multiple network regions as a lower scoring network region among the multiple network regions; and
sending first configuration parameters for the first network region to the identified network element in the second network region for modification of the network element's configuration parameters.

* * * * *